US012650723B2

(12) United States Patent
MacNamara et al.

(10) Patent No.: US 12,650,723 B2
(45) Date of Patent: Jun. 9, 2026

(54) SOFTWARE ENTITY POWER CONSUMPTION ESTIMATION AND MONITORING

(71) Applicant: Intel Corporation, Santa Clara, CA (US)

(72) Inventors: Chris M. MacNamara, Ballyclough (IE); John J. Browne, Limerick (IE); Amruta Misra, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 17/482,327

(22) Filed: Sep. 22, 2021

(65) Prior Publication Data

US 2022/0011843 A1 Jan. 13, 2022

(51) Int. Cl.
*G06F 1/324* (2019.01)
*G06F 1/28* (2006.01)
*G06F 11/30* (2006.01)
*G06F 9/455* (2018.01)

(52) U.S. Cl.
CPC ............... *G06F 1/324* (2013.01); *G06F 1/28* (2013.01); *G06F 11/3062* (2013.01); *G06F 9/45558* (2013.01); *G06F 2009/45591* (2013.01)

(58) Field of Classification Search
CPC .......... G06F 1/324; G06F 1/26; G06F 1/3209;
G06F 1/3243; G06F 11/3062; G06F
11/3006; G06F 11/302; G06F 9/45558;
G06F 2009/45591; G06F 2201/815;
Y02D 10/00
See application file for complete search history.

(56) References Cited

U.S. PATENT DOCUMENTS

| | | | | |
|---|---|---|---|---|
| 10,097,091 B1* | 10/2018 | Huang | ................ | H02M 3/1582 |
| 2002/0194509 A1* | 12/2002 | Plante | .................... | G06F 1/324 |
| | | | | 713/300 |
| 2005/0262504 A1* | 11/2005 | Esfahany | .............. | G06F 9/5077 |
| | | | | 718/1 |
| 2007/0055830 A1* | 3/2007 | Brenner | ................ | G06F 9/4881 |
| | | | | 711/153 |
| 2008/0028411 A1* | 1/2008 | Cherkasova | ........ | G06F 11/3433 |
| | | | | 718/104 |
| 2008/0184227 A1* | 7/2008 | Matsumoto | ........... | G06F 9/5077 |
| | | | | 718/1 |
| 2009/0307440 A1* | 12/2009 | Jacobs | ................ | G06F 11/0793 |
| | | | | 718/1 |

(Continued)

*Primary Examiner* — Kim Huynh
(74) *Attorney, Agent, or Firm* — Alliance IP, LLC

(57) ABSTRACT

Telemetry information in the form of platform telemetry, virtualization layer telemetry, and application telemetry can be used to estimate power consumption of a software entity, such as a virtual machine, container, application, or network slice. A controller can take various actions based on software entity power consumption information. If a power limit of an integrated circuit component is exceeded, the controller can reduce the power consumption of a software entity or move the software entity to another integrated circuit component to reduce the power consumption of the integrated circuit component. The controller can determine a total software entity power consumption for software entities associated with a user entity and take actions to keep the total software entity power consumption within a power budget.

23 Claims, 5 Drawing Sheets

(56) References Cited

U.S. PATENT DOCUMENTS

2012/0272235 A1* 10/2012 Fahrig ................... G06F 9/5077
                                                718/1
2012/0278800 A1* 11/2012 Nicholas ............ G06F 9/45558
                                                718/1
2015/0355883 A1* 12/2015 Kegel .................... G06F 5/085
                                                711/165
2017/0315915 A1* 11/2017 Meswani ............. G06F 9/5016
2018/0129503 A1*  5/2018 Narayan ............ H03K 19/0175
2018/0329742 A1* 11/2018 Lo ........................ G06F 9/5027

* cited by examiner

Controller 112

SDN controller 190

NFV MFNO 199

NFVO 194 | VIM 196 | VNFM 198

Control information 186

Computing devices 188

Telemetry Information 192

Monitoring and Analytics System 108

Power estimator 172

Telemetry information 166

Telemetry information 164

180

Database 184

Computing device 104

Telemetry information 164

Telemetry Agent 168

VM 128
Application 136

VM 132
Application 140

Hypervisor 124

OS 120

Platform resources 116

Container 148
Application 136

Container 152
Application 140

Container Engine 156

OS 120

Platform resources 116

160

144

VM 128
Application 136

VM 132
Application 140

Hypervisor 124

Platform resources 116

200

300

RECEIVE TELEMETRY INFORMATION ASSOCIATED WITH COMPUTING
PLATFORM ON WHICH SOFTWARE ENTITY IS EXECUTING

<u>310</u>

DETERMINE SOFTWARE ENTITY POWER CONSUMPTION BASED ON TELEMETRY
INFORMATION

<u>320</u>

MEMORY 510

CODE
515

PROCESSOR UNIT 500

FRONT END LOGIC 520

DECODER(S)
530

REGISTER
RENAMING
LOGIC
535

SCHEDULING
LOGIC
540

EXECUTION LOGIC 550

EU-1
565-1

EU-2
565-2

· · ·

EU-N
565-N

BACK END LOGIC 570

RETIREMENT LOGIC
575

SOFTWARE ENTITY POWER CONSUMPTION ESTIMATION AND MONITORING

BACKGROUND

An orchestrator or controller can deploy and monitor the performance of virtual machines, containers, network slices, and applications to compute, storage, and network resources in, for example, a data center. A computing device platform can provide metrics that provide insight into computing device performance.

BRIEF DESCRIPTION OF THE DRAWINGS

FIG. 1 illustrates a block diagram of an example computing system comprising a power estimator to estimate the power consumption of software entities.

DETAILED DESCRIPTION

Figure 2:
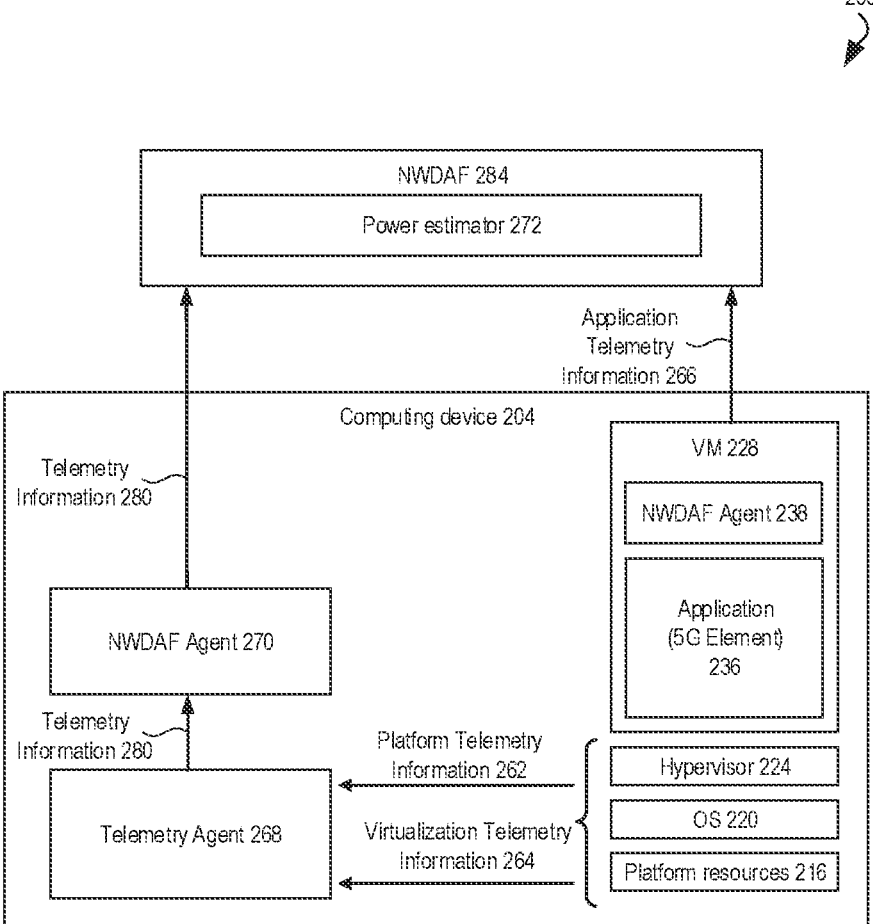
FIG. 2 illustrates a block diagram of an example computing system in which the power estimator is implemented as part of a 3GPP Network Data Analytics Function (NWDAF).

In some existing computing systems, a computing device can provide telemetry information that indicates the performance of the computing device, including the performance of specific computing device components and applications executing on the computing device. For example, some existing systems can provide telemetry information indicating a total amount of power consumed by an integrated circuit component, such as a CPU (central processing unit). In some existing computing systems, this telemetry information is provided by an implementation of a Redfish IPMI (Intelligent Platform Management Interface) out of band interface. Telemetry information can also indicate the operating frequency of individual processor units (e.g., cores) within an integrated circuit component. However, the total amount of power consumed by an integrated circuit component and the operating frequency of individual processor units within the integrated circuit component may not provide the amount of power consumed by individual software entities executing on a computing system.

The technologies described herein provide for the estimation and monitoring of power consumed by individual software entities, such as virtual machines, containers, network slices, and other applications executing on a computing device. A power estimator estimates the power consumed by a software entity (software entity power consumption) based on telemetry information provided by a computing device's platform. The power consumption of software entities can be reported to user entities, such as customers of cloud service or network service providers, utilized for billing purposes, and utilized to keep the total software entity power consumption of software entities associated with a user entity within a power budget. A controller or orchestrator can take actions based on software entity power consumption information to reduce software entity power consumption, such as moving a software entity to a different processor unit or integrated circuit component that may execute the software entity more efficiently, or throttling down the operating frequency of a processor unit on which a software entity is executing.

The estimation and monitoring of software entity power consumption may provide at least the following advantages. Estimating power consumption at the software entity level provides insight to user entities and service providers about the power consumption of the software entities associated with a user entity. The reporting of software entity power consumption to user entities can make them aware of software entities that are unexpectedly consuming a large amount of power and may revise such software entities so that they execute more efficiently. Further, service providers may be able to implement billing schedules that charge user entities on the basis of power consumption. The availability of power consumption information at the software entity level also allows the deployment and management of virtual machines, containers, and applications in a computing system to be controlled with a finer level of granularity.

As used herein, the term "integrated circuit component" refers to a packaged or unpacked integrated circuit product. A packaged integrated circuit component comprises one or more integrated circuit dies mounted on a package substrate with the integrated circuit dies and package substrate encapsulated in a casing material, such as a metal, plastic, glass, or ceramic. In one example, a packaged integrated circuit component contains one or more processor units mounted on a substrate with an exterior surface of the substrate comprising a solder ball grid array (BGA). In one example of an unpackaged integrated circuit component, a single monolithic integrated circuit die comprises solder bumps attached to contacts on the die. The solder bumps allow the die to be directly attached to a printed circuit board.

An integrated circuit component can comprise one or more processor units (e.g., system-on-a-chip (SoC), processor core, graphics processor unit (GPU), accelerator, chipset processor, or any other integrated circuit die capable of executing software entity instructions). An integrated circuit component can further comprise non-processor unit circuitry, such as shared cache memory (e.g., level 3 (L3), level 4 (L4), or last-level cache (LLC)), controllers (e.g., memory controller, interconnect controller (e.g., Peripheral Component Interconnect express (PCIe), Intel® QuickPath Interconnect (QPI) controller, Intel® Ultra Path Interconnect (UPI) controller), snoop filters, etc. In some embodiments, the non-processor unit circuitry can collectively be referred to as the "uncore" or "system agent" components of an integrated circuit component. In some embodiments, non-processor unit circuitry can be located on multiple integrated circuit dies within an integrated circuit component and different portions of the non-processor unit circuitry (whether located on the same integrated circuit die or different integrated circuit dies) can be provided different clock signals that can operate at the same or different frequencies. That is, different portions of the non-processor unit circuitry can operate in different clock domains.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform, or resource, even though software or firmware instructions are not actively being executed by the system, device, platform, or resource.

In the following description, specific details are set forth, but embodiments of the technologies described herein may be practiced without these specific details. Well-known circuits, structures, and techniques have not been shown in detail to avoid obscuring an understanding of this description. Phrases such as "an embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact. Furthermore, the terms "comprising," "including," "having," and the like, as used with respect to embodiments of the present disclosure, are synonymous.

Reference is now made to the drawings, which are not necessarily drawn to scale, wherein similar or same numbers may be used to designate the same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an example computing system comprising a power estimator to estimate the power consumption of software entities. The computing system 100 comprises a computing device 104, a monitoring and analytics system 108, and a controller 112. The computing system 100 can comprise one or more computing systems or devices described or referenced herein. The computing device 104 can similarly be any computing system or device described or referenced herein. The computing device 104 comprises platform resources 116 upon which an operating system 120 operates. A hypervisor (or virtual machine monitor (VMM)) 124 operates on the operating system 120 and hosts virtual machines (VMs) 128 and 132. The VMs 128 and 132 host applications 136 and 140, respectively. In embodiments where the virtual computing environment established on the computing device 104 is a network functional virtualization (NFV) environment, the applications 136 and 140 can be virtual network functions (VNFs), and the platform resources 116, the operating system 120, and the hypervisor 124, can together define a network function virtualization infrastructure (NFVI).

The platform resources 116 comprise one or more integrated circuit components. Individual integrated circuit components comprise one or more processor units and may also comprise non-processor unit circuitry, as described above. The platform resources 116 can further comprise platform-level components such as voltage regulators and a baseboard management controller (BMC). In one embodiment, the computing device 104 is a server, and the platform resources 116 comprise one or more multi-core server processors. The operating system 120 can be any type of operating system, such as Windows or a Linux-based server operating system. In embodiments where the application 136 or 140 is a VNF, the VNF can be any virtualized network function, such as a virtualized router, firewall, load balancer, or intrusion detection device.

The hypervisor 124 is a type-2 or hosted hypervisor as it is running on the operating system 120. In some embodiments, the hypervisor 124 can be a type-1 or "bare-metal" hypervisor running directly on the platform resources 116 of the computing device 104 without an intervening operating system layer, as illustrated by the dashed boxes in stack 144. In other embodiments, the applications 136 and 140 operate within a container environment. For example, the applications 136 and 140 can execute within containers 148 and 152, respectively, and the containers 148 and 152 can operate on a container engine 156 that in turn executes on the operating system 120, as shown by the dashed boxes in stack 160.

The power consumption of a software entity executing on the computing device can be estimated from telemetry information 164 that is associated with a computing platform on which a software entity is executing. A computing platform can comprise both hardware and software components. For example, a computing platform for the computing device 104 comprises the platform resources 116, the operating system 120, and/or the virtualization layer (e.g., hypervisor 124, container engine 156). One such type of telemetry information is KPIs (key performance indicators). The telemetry information 164 can comprise platform telemetry information, virtualization telemetry information, and application telemetry information. Platform telemetry information can be provided by the platform resources 116, virtualization telemetry information can be provided by the virtualization layer (e.g., hypervisor 124, container engine 156), and application telemetry can be made available by an application operating on a virtual machine or container (e.g., application 136 or 140).

As used herein the term "software entity" can refer to a virtual machine, hypervisor, container engine, operating system, application, workload, network slice, or any other collection of instructions executable by a computing device or computing system. The software entity can be at least partially stored in one or more volatile or non-volatile computer-readable media of a computing device. As a software entity can comprise instructions stored in one or more non-volatile memories of a computing device, the term "software entity" includes firmware.

Platform telemetry information can be made available by the platform resources 116. In some embodiments, platform telemetry information can be made available by one or more performance counters or monitors, such as an Intel® Performance Monitor Unit (PMU). The performance counters or monitors can provide telemetry information at the processor unit, integrated circuit component, or platform level. Platform telemetry information can comprise one or more of the following: information indicating the number of processor units in an integrated circuit component, information indicating an integrated circuit component power consumption, information indicating a reference operating frequency of an integrated circuit component, and information indicating an operating frequency of individual processor units in an integrated circuit component.

Platform telemetry information can further comprise processor unit active information indicating an amount of time a processor unit has been in an active state and processor unit idle information indicating an amount of time a processor unit has been in a particular idle state. Processor unit active information and processor unit idle information can be provided as an amount of time (e.g., ns) or a percentage of time over a monitoring period (e.g., the time since platform telemetry information for a particular metric was last provided by a computing platform component). For processor units that have multiple idle states, processor unit idle information can be provided for the individual idle states. For processor units that have multiple active states, processor unit active information can be provided for the individual active states. Processor unit active information and processor unit idle information can be provided for the individual processor units in an integrated circuit component.

As used herein, the term "active state" when referring to the state of a processor unit refers to a state in which the processor unit is executing instructions. As used herein, the term "idle state" means a state in which a processor unit is not executing instructions. Modern processor units can have various idle states with the varying idle states being distinguished by, for example, how much total power the processor unit consumes in the idle state and idle state exit costs (e.g., how much time and how much power it takes for the processor unit to transition from the idle state to an active state).

Idle states for some existing processor units can be referred to as "C-states". In one example of a set of idle states, some Intel® processors can be placed in C1, C1E, C3, C6, C7, and C8 idle states. This is in addition to a "C0" state, which is the processor's active state. P-states can further describe the active state of some Intel® processors, with the various P-states indicating the processor's power supply voltage and operating frequency. The C1/C1E states are "auto halt" states in which all processes in a processor unit are performing a HALT or MWAIT instruction and the processor unit core clock is stopped. In the C1E state, the processor unit is operating in a state with its lowest frequency and supply voltage and with PLLs (phase-locked loops) still operating. In the C3 state, the processor unit's L1 (Level 1) and L2 (Level 2) caches are flushed to lower-level caches (e.g., L3 (Level 3) or LLC (last level cache)), the core clock and PLLs are stopped, and the processor unit operates at an operating voltage sufficient to allow it to maintain its state. In the C6 and deeper idle states (idle states that consume less power than other idle states), the processor unit stores its state to memory and its operating voltage is reduced to zero. As modern integrated circuit components can comprise multiple processor units, the individual processor units can be in their own idle states. These states can be referred to as C-states (core-states). Package C-states (PC-states) refer to idle states of integrated circuit components comprising multiple cores.

In some embodiments, where a processor unit can be in one of various idle states, with the varying idle states being distinguished by how much power the processor unit consumes in the idle state, the processor unit active information can indicate an amount of time that a processor unit has been in an active state or a shallow idle state or a percentage of time that the processor unit has been in an active state or a shallow idle state. In some embodiments, the shallow idle states comprise idle states in which the processor units do not store their state to memory and do not have their operating voltage reduced to zero. In some embodiments, a shallow idle state is an idle state that is shallower (consumes more power than) a threshold idle state. For example, in some embodiments wherein the processor units are Intel® processor units, the threshold idle state is the C6 idle state.

Platform telemetry information can further comprise one or more of the following: information indicating one or more operating frequencies of the non-processor unit circuitry of the integrated circuit component, information indicating an operating frequency of a memory controller of the integrated circuit component, information indicating a utilization of a memory external to the integrated circuit component by a software entity, information indicating a total memory controller utilization by software entities executing on the integrated circuit component, information indicating an operating frequency of individual interconnect controllers of an integrated circuit component, information indicating a utilization of an interconnect controller by a software entity, and information indicating a total interconnect controller utilization by the software entities executing on an integrated circuit component.

The platform telemetry information relating to non-processor unit circuitry can be provided by one or more performance monitoring units located in the portion of the integrated circuit component in which the non-processor units are located. In some embodiments, platform telemetry information indicating memory utilization is provided by the memory bandwidth monitoring component of Intel® Resource Director technology. In some embodiments, the platform telemetry information indicating an interconnect controller utilization can be related to PCIe technology, such as a utilization of a PCIe link.

Platform telemetry information can further comprise one or more of the following: software entity identification information for software entities executing on an integrated circuit component, a user identifier associated with a software entity, information indicating processor unit threads and software entities associated with the processor unit core threads.

Platform telemetry information can further comprise computing device topology information, which can comprise the number of integrated circuit components in a computing device, the number of processor units in an integrated circuit component, integrated circuit component identifying information and processor unit identifying information. In some embodiments, topology information can be provided by operating system commands, such as NumCPUs, NumCores, CPUsPerCore, CPUInfo, and CPUDetails.

In some embodiments, platform telemetry information can be provided by plugins to an operating system daemon, such as the Linux collected daemon turbostat plugin, which can provide information about an integrated circuit component topology, frequency, idle power-state statistics, temperature, power usage, etc. In applications that are DPDK-enabled (Data Plane Development Kit), platform telemetry information can be based on information provided by DPDK telemetry plugins. In some embodiments, platform telemetry information can be provided out of band as a rack-level metric, such as an Intel® Rack Scale Design metric.

Virtualization telemetry information can be made available by the hypervisor layer (hypervisor 124 or container engine 156). Virtualization telemetry information can comprise one or more of the following: information indicating the number of physical processor units allocated to a logical or virtual processor unit (e.g., virtual CPUs (vCPUs)), information indicating a utilization of a virtual processor unit by a software entity, information indicating a DPDK busyness per virtual processor unit per software entity, information indicating a libvirt utilization per software entity, information indicating which physical processor units a software entity is executing upon, and information indicating which virtual processor units a software entity is executing upon. In some embodiments, information indicating which physical or virtual processor unit a software entity is executing on can be provided by the controller 112 to the power estimator 172 as telemetry information 166.

Allocation of a physical processor unit to a virtual processor includes allocation of a portion of a physical processor unit to a virtual processor unit. Thus, allocation of one or more physical processor units to a virtual processor includes the allocation of, for example, 0.6, 1.2, or 2.3 physical processor units to a virtual processor unit. DPDK busyness telemetry information can be provided by a DPDK library and indicate utilization of a processor unit or a virtual processor unit by a DPDK-enabled application to execute instructions not relating to polling of a network interface controller.

Application telemetry information can be made available by the application 136 or 140. Application telemetry information can comprise one or more of the following: information indicating a utilization of a virtual processor unit by an application and information indicating DPDK busyness per application. In some embodiments, the application 136 or 140 can be part of a network slice, such as a user plane function (UPF) of a 3GPP (Third Generation Partnership Project) 5G core infrastructure system architecture. If the application 136 or 140 is part of a network slice, the computing device 104 can be part of, for example, a radio access network (RAN), transport network, or a core network. The software entity power consumption of an application that is part of a network slice can be summed with the software entity power consumption of one or more other applications that are part of a network slice to determine a power consumption for the network slice. In embodiments where the application 136 or 140 is a UPF, the application telemetry can comprise UPF KPIs. If the application is not instrumented to generate application telemetry information, in some embodiments, the controller 112 can instrument the application to provide application telemetry.

The computing device 104 comprises a telemetry agent 168 that receives the telemetry information 164 and provides it to the power estimator 172. The telemetry agent 168 can send collected telemetry information to the power estimator 172 as it is received, periodically, upon request by the power estimator 172, or on another basis. The telemetry information 164 can be pulled by the telemetry agent 168 (e.g., provided to the telemetry agent 168 in response to a request by the telemetry agent 168) or pushed to the telemetry agent 168 by any of the various components of the computing device (e.g., platform resources 116, operating system 120, container engine 156, hypervisor 124, virtual machine 128 or 132, container 148 or 152, or application 136 or 140). Telemetry information 164 can be pushed to the telemetry agent 168 on a periodic or another basis. For example, an application that is part of a network slice can provide virtual processor unit utilization information at one second intervals. In some embodiments, the telemetry agent 168 is a plugin-based agent for collecting metrics, such as telegraf. In some embodiments, platform telemetry metrics can be based on the Intel® powerstat telegraf plugin.

In some embodiments, telemetry information can be generated by system statistics daemon collectd plugins (e.g., turbostat, CPU, CPUFreq, DPDK_telemetry, Open vSwitchrelated plugins (e.g., ovs_stats, ovs_events), python (which allows for the collection of user-selected telemetry), ethstat). In some embodiments, telemetry information can be made available by a baseboard management controller (BMC). Platform telemetry information can be provided by various components or technologies integrated into a processor unit, such as PCIe controllers. In some embodiments, platform telemetry information can be provided by various tools and processes, such as kernel tools (such as lspci, lstopo, dmi-decode, and ethtool), DPDK extended statistics, OvS utilities (such as ovs-vsctl and ovs-ofctl), operating system utilities (e.g., the Linux dropwatch utility), and orchestration utilities.

The telemetry information 164 can be provided in various measures or formats, depending on the telemetry information being provided. For example, time-related telemetry information can be provided in an amount of time (e.g., ns) or a percentage of a monitoring period (the time between the provision of successive instances of telemetry information by a computing device component to the telemetry agent 168). For telemetry information relating to a list of cores, cores can be identified by a core identifier. Telemetry information relating to utilization (e.g., physical processor unit utilization, virtual processor unit utilization, memory controller utilization, memory utilization, interconnect controller utilization) can be provided as, for example, a number of cycle counts, an amount of power consumed in watts, an amount of bandwidth consumed in gigabytes/second, or a percentage of a full utilization of the resource by a software entity. Telemetry information for processor units can be for logical or physical processor units. Telemetry information relating to frequency can be provided as an absolute frequency in hertz, or a percentage of a reference or characteristic frequency of a component (e.g., base frequency, maximum turbo frequency). Telemetry information related to power consumption can be provided as an absolute power number in watts or a relative power measure (e.g., current power consumption relative to a characteristic power level, such as TDP (thermal design power).

In some embodiments, the telemetry agent 168 can determine telemetry information based on other telemetry information. For example, an operating frequency for a processing unit can be determined based on a ratio of telemetry information indicating a number of processor unit cycle counts while a thread is operating on the processor unit when the processor unit is not in a halt state to telemetry information indicating a number of cycles of a reference clock (e.g., a time stamp counter) when the processor unit is not in a halt state. In some embodiments, the power estimator 172 can determine telemetry information from other telemetry information as well.

The telemetry information 164 is provided to a power estimator 172 that is located in the monitoring and analytics system 108. The power estimator 172 determines software entity power consumption for software entities executing on the computing device 104 based on the telemetry information 164 provided to the power estimator 172. The power estimator 172 can determine software entity power consumption for software entities executing on additional computing devices 188 based on telemetry information 192. In some embodiments, the power estimator 172 can utilize telemetry information indicating which software entities are executing upon which physical processor units and/or which virtual processor units in determining the software entity power consumption so that telemetry information associated with the physical processor units and/or the virtual processors upon which a software entity is executing is used in determining the software entity power consumption for the software entity.

In some embodiments, the power estimator 172 can determine software entity power consumption by estimating a per-processor unit power consumption and scaling the per-processor unit power consumption by one or more scaling factors based on the telemetry information 164 to provide a more accurate estimation of the amount of power consumed by a software entity. The per-processor unit power consumption can be determined by dividing an integrated circuit component power consumption by the number of processor units in the integrated circuit component. The telemetry information 164 received by the power estimator 172 can comprise information indicating integrated circuit component power consumption and information indicating the number of processor units in the integrated circuit component. In some embodiments, the number of processor units in the integrated circuit component can be determined by the power estimator 172 determining the number of individual processor unit operating frequencies contained in the telemetry information 164.

In some embodiments, the software entity power consumption $P_{swe}$ for a software entity can be determined according to equation 1.

$$P_{swe}=P_{ppu}(SF_{pu}SF_{pu\_active}SF_{vpu\_ppu}SF_{util\_vpu}+SF_{npu}) \qquad \text{Eq. (1)}$$

where $P_{ppu}$ is a per-processor unit power consumption, $SF_{pu}$ is a physical processor unit power consumption scaling factor for an integrated circuit component, $SF_{npu}$ is a non-processor unit circuitry power consumption scaling factor for an integrated circuit component, $SF_{pu\_active}$ is a physical processor unit active scaling factor, $SF_{vpu\_ppu}$ is a virtual processor unit-to-physical processor unit scaling factor, and $SF_{util\_vpu}$ is a virtual processor unit utilization scaling factor.

The physical processor unit scaling factor $SF_{pu}$ indicates a portion of an integrated circuit component power consumption attributable to the physical processor units of the integrated circuit component and the non-processor unit circuitry scaling factor $SF_{npu}$ indicates a portion of the integrated circuit component power consumption attributable to the non-processor unit circuitry of the integrated circuit component. For example, an $SF_{pu}$ of 0.6 indicates that the processor units in an integrated circuit component consume 60% of the integrated circuit component power and a $SF_{npu}$ of 0.4 indicates that the non-processor unit circuitry of the integrated circuit component consumes 40% of the integrated circuit component power. In some embodiments, the $SF_{pu}$ and $SF_{npu}$ values for an integrated circuit component are predetermined values. In some embodiments, the power estimator 172 utilizes $SF_{pu}$ and $SF_{npu}$ values based on the specific integrated circuit component on which the software entity is executing. In some embodiments, the telemetry information 164 can comprise integrated circuit component identifying information (e.g., integrated circuit component model, type, SKU) and the power estimator 172 can access a data structure to retrieve $SF_{pu}$ and $SF_{npu}$ values, using integrated circuit component identifying information as the key. In some embodiments, the $SF_{pu}$ and $SF_{npu}$ values can add up to 1.0 and in other embodiments, the $SF_{pu}$ and $SF_{npu}$ values can add up to less than 1.0.

The physical processor unit active scaling factor $SF_{pu\_active}$ indicates the portion of time that a physical processor unit on which the software entity is executing is in an active state. An $SF_{pu\_active}$ of 0.8 indicates that a processor unit has been in an active state 80% of the time over a monitoring period. In some embodiments, the physical processor unit active scaling factor indicates the portion of time that the processor unit is in an active state or in a shallow idle that is shallower (consumes more power than) than a threshold idle state. In such embodiments, a processor unit that has been in an active state or a shallow idle state 90% of the time over a monitoring period would have an associated $SF_{pu\_active}$ of 0.9. The physical processor unit active scaling factor can be determined from processor unit active information in the telemetry information 164 and, if the processor unit active scaling factor indicates the portion of time that the processor unit is in an active state or a shallow idle state, from the processor unit idle information in the telemetry information 164.

The virtual processor unit to physical processor unit scaling factor $SF_{vpu\_ppu}$ indicates the number of physical processor units allocated to a logical or virtual processor unit upon which the software entity is executing. $SF_{vpu\_ppu}$ can be an integer or a non-integer value. If the virtualization layer has allocated less than one physical processor unit for the virtual processor unit upon which the software entity is executing, $SF_{vpu\_ppu}$ is less than 1.0. If the virtual layer has allocated more than one physical processor unit for the virtual processor unit upon which the software entity is executing, $SF_{vpu\_ppu}$ is greater than 1.0. $SF_{vpu\_ppu}$ can be based on information indicating the number of physical processor units allocated to a virtual processor unit in the telemetry information 164.

The virtual processor unit utilization scaling factor $SF_{util\_vpu}$ indicates a utilization of a virtual processor unit on which the software entity is executing. For example, a $SF_{util\_vpu}$ of 0.5 indicates that a software entity is utilizing 50% of a virtual processor unit over a monitoring period. The virtual processor unit utilization scaling factor can be determined from virtualization telemetry information or application telemetry information (provided by, for example, an application that is part of a network slice) indicating a utilization of a virtual processor unit by the software entity or DPDK busyness of a virtual processor unit by the software entity.

In some embodiments, the software entity power consumption for a software entity can be determined according to equation 2.

$$P_{swe}=P_{ppu}(SF_{pu}SF_{pu\_active}SF_{vpu\_ppu}SF_{util\_vpu} \\ SF_{pu\_freq}+SF_{npu}) \qquad \text{Eq. (2)}$$

Equation 2 is similar to equation 1 but with the processor unit power consumption scaling factor $SF_{pu}$ further scaled by a physical processor unit operating frequency scaling factor $SF_{pu\_freq}$. The physical processor unit operating frequency scaling factor $SF_{pu\_freq}$ is a ratio of the operating frequency of a physical processor unit on which the software entity is executing to a reference operating frequency of the integrated circuit component, such as a base frequency of the integrated circuit component. In some embodiments, the physical processor unit operating frequency scaling factor can be determined based on the following telemetry information 164: information indicating an operating frequency of the one or more physical processor units upon which the software entity is executing and a reference operating frequency of the integrated circuit component.

If more than one physical processor unit has been allocated to a virtual processor unit, the physical processor unit operating frequency scaling factor $SF_{pu\_freq}$ can be based on the operating frequencies of the individual physical processing units allocated to the virtual processor unit. For example, $SF_{pu\_freq}$ can be based on an average, weighted average (with the weight given to the individual operating frequencies being based on, for example, the portion of the physical processor unit associated with the individual operating frequency allocated to the virtual processor unit), or another function of the operating frequencies of the individual physical processor units allocated to the virtual processor unit. The physical processor unit activity factor $SF_{pu\_active}$ can similarly be based on physical processor unit active information and physical processor unit idle information for individual physical processor units allocated to a virtual processor unit.

In some embodiments, the software entity power consumption for a software entity can be determined according to equation 3.

$$P_{swe}=P_{ppu}(SF_{pu}SF_{pu\_active}SF_{vpu\_ppu}SF_{util\_vpu}+ SF_{npu}SF_{npu\_freq}) \qquad \text{Eq. (3)}$$

Equation 3 is similar to equation 1 but with the non-processor unit circuitry scaling factor $SF_{npu}$ scaled by a non-processor unit circuitry operating frequency scaling factor $SF_{npu\_freq}$. The non-processor unit operating frequency scaling factor $SF_{npu\_freq}$ is a ratio of the operating frequency of the non-processor unit circuitry to a reference operating frequency of the integrated circuit component, such as a base operating frequency of the integrated circuit component. Thus, an $SF_{npu\_freq}$ of less than 1.0 indicates that the non-processor unit circuitry is operating at a frequency below the reference operating frequency and an $SF_{npu\_freq}$ of greater than 1.0 indicates that the non-processor unit is operating at a frequency above the reference operating frequency. In some embodiments, the non-processor unit operating frequency scaling factor can be determined based on telemetry information 164 indicating an operating frequency of the non-processor unit circuitry and a reference operating frequency of the integrated circuit component.

If the non-processor unit circuitry has more than one clock domain, the non-processor unit operating frequency scaling factor $SF_{npu\_freq}$ can be based on the operating frequencies of the individual non processor unit circuitry clock domains. For example, $SF_{npu\_freq}$ can be an average, weighted average (with the weight given to the individual operating frequencies being based on, for example, the portion of the non-processor unit circuitry operating within the individual clock domain), or another function of the operating frequencies of the non-processor unit circuitry clock domains.

In some embodiments, the software entity power consumption for a software entity can be determined according to equation 4.

$$P_{swe}=P_{ppu}(SF_{pu}SF_{pu\_active}SF_{vpu\_ppu}SF_{util\_vpu}+ SF_{npu}SF_{mem\_freq}) \qquad \text{Eq. (4)}$$

Equation 4 is similar to equation 1 but with the non-processor unit circuitry scaling factor $SF_{npu}$ scaled by a memory controller operating frequency scaling factor $SF_{mem\_freq}$. The memory controller operating frequency scaling factor $SF_{mem\_freq}$ is a ratio of the operating frequency of a memory controller of the non-processor unit circuitry to a reference operating frequency of the integrated circuit component. In some embodiments, the memory controller operating frequency scaling factor can be determined based on the following telemetry information 164: information indicating an operating frequency of a memory controller in the non-processor unit circuitry and information indicating a reference operating frequency of the integrated circuit component.

In some embodiments, the software entity power consumption for a software entity can be estimated according to equation 5.

$$P_{swe}=P_{ppu}(SF_{pu}SF_{pu\_active}SF_{vpu\_ppu}SF_{util\_vpu}+ SF_{npu}SF_{mem\_util}) \qquad \text{Eq. (5)}$$

Equation 5 is similar to equation 1 but with the non-processor unit circuitry scaling factor $SF_{npu}$ scaled by a memory utilization scaling factor $SF_{mem\_util}$. The $SF_{mem\_util}$ can be based on the following telemetry information 164: a utilization by the software entity of memory external to the integrated circuit component (and controlled by a memory controller that is part of the non-processor unit circuitry) and the utilization of the memory by one or more additional software entities executing on the same integrated circuit component as the software entity. In some embodiments, the memory scaling factor $SF_{mem\_util}$ is a ratio of the utilization by the software entity of the memory to an average utilization of the memory by one or more software entities executing on the integrated circuit component. If the software entity is utilizing more of the memory relative to an average utilization of the memory by one or more software entities executing on the integrated circuit component, $SF_{mem\_util}$ is greater than 1.0. If the software entity is utilizing less of the memory relative to an average utilization of memory by one or more software entities executing on the integrated circuit component, $SF_{mem\_util}$ is less than 1.0.

The average utilization of the memory by the software entities executing on the integrated circuit component can be determined by, for example, averaging the memory utilization of the individual software entities, or by dividing a total memory utilization by the software entities divided by the number of software entities executing on the integrated circuit component. The number of software entities executing on the integrated circuit component can be provided in the telemetry information or determined by the power estimator 172 based on the telemetry information 164.

In some embodiments, the software entity power consumption for a software entity can be estimated according to equation 6.

$$P_{swe}=P_{ppu}(SF_{pu}SF_{pu\_active}SF_{vpu\_ppu}SF_{util\_vpu}+SF_{npu}S- F_{IC\_freq}) \qquad \text{Eq. (6)}$$

Equation 6 is similar to equation 1 but with the non-processor unit circuitry scaling factor $SF_{npu}$ scaled by an interconnect controller operating frequency scaling factor $SF_{IC\_freq}$. The interconnect controller frequency scaling factor $SF_{IC\_freq}$ is a ratio of the operating frequency of an interconnect controller of the non-processor unit circuitry to a reference operating frequency of the integrated circuit component. In some embodiments, the interconnect controller operating frequency scaling factor can be determined based on the telemetry information 164 indicating an operating frequency of an interconnect controller in the non-processor unit circuitry and information indicating a reference operating frequency of the integrated circuit component.

In some embodiments, the software entity power consumption for a software entity can be estimated according to equation 7.

$$P_{swe}=P_{ppu}(SF_{pu}SF_{pu\_active}SF_{vpu\_ppu}SF_{util\_vpu}+SF_{npu}S- F_{IC\_util}) \qquad \text{Eq. (7)}$$

Equation 7 is similar to equation 1 but with the non-processor unit circuitry scaling factor $SF_{npu}$ scaled by an interconnect controller utilization scaling factor $SF_{IC\_util}$. The interconnect controller utilization scaling factor $SF_{IC\_util}$ can be based on the telemetry information 164 utilization of an interconnect controller that is part of the non-processor unit circuitry by the software entity and utilization of the interconnect controller by one or more additional software entities executing on the same integrated circuit component as the software entity. In some embodiments, $SF_{IC\_util}$ is a ratio of the utilization by the software entity of an interconnect controller to an average utilization of the interconnect controller by one or more software entities executing on the integrated circuit component. If the software entity is utilizing more of the interconnect controller relative to an average utilization of the interconnect controller by the one or more software entities executing on the integrated circuit component, $SF_{IC\_util}$ is greater than 1.0. If the software entity is utilizing less of the interconnect controller relative to an average utilization of the interconnect controller by the one or more software entities executing on the integrated circuit component, $SF_{IC\_util}$ is less than 1.0.

The average utilization of the interconnect controller by the software entities executing on the integrated circuit component can be determined by, for example, averaging the interconnect controller utilization of the individual software entities, or by dividing a total interconnect controller utilization by the software entities divided by the number of software entities executing of the integrated circuit component.

If the non-processor unit circuitry comprises more than one interconnect controller, the interconnect controller frequency scaling factor $SF_{IC\_freq}$ can be based on the operating frequencies of the individual interconnect controllers utilized by the software entity, which can be included in the telemetry information 164. For example, $SF_{IC\_freq}$ can be an average, a weighted average (with the weight given to each interconnect controller operating frequency being based on, the utilization of the interconnect controller by the software entity), or other function of the operating frequencies of the individual interconnect controllers utilized by the software entity. The interconnect controller utilization factor $SF_{IC\_util}$ can similarly be based on the interconnect controller utilization of multiple interconnect controllers utilized by a software entity.

In some embodiments, the software entity power consumption for a software entity can be estimated according to equation 8, which includes the scaling factors of equations 1 through 7.

$$P_{swe}=P_{ppu}(SF_{pu}SF_{pu\_active}SF_{pu\_freq}SF_{vpu\_ppu}$$
$$SF_{util\_vpu}+SF_{npu}SF_{npu\_freq}SF_{mem\_freq}SF_{mem\_util}S-$$
$$F_{IC\_freq}SF_{IC\_util}) \quad\quad\quad \text{Eq. (8)}$$

In some embodiments, the software entity power consumption for a software entity, $P_{swe}$, can be estimated according to an equation different from Equations 1-8. In such embodiments, the processor unit scaling factor $SF_{npu}$ can be scaled by one or more of $SF_{mem\_freq}$, $SF_{mem\_util}$, $SF_{IC\_freq}$ and $SF_{IC\_util}$, and the non-processor unit circuitry scaling factor $SF_{pu}$ can be scaled by one or more of $SF_{pu\_active}$, $SF_{pu\_freq}$, $SF_{vpu\_ppu}$, and $SF_{util\_vpu}$.

The software entity power consumptions determined by the power estimator 172 can be displayed on a display 180 that is local to any component of the system 100 (e.g., controller 112, computing device 104, monitoring and analytics system 108) or remote to the system 100. Further, software entity power consumptions can be stored at a database 184. The database 184 can be local or remote to any component of the system 100. The database 184 can be a centralized database stored at one computing device or distributed database stored across multiple computing devices. The database 184 can be updated with current software entity power consumption on a periodic or any other basis. The database 184 can be updated by any component of the system 100 (e.g., controller 112, computing device 104, power estimator 172).

The controller 112 is responsible for managing various tasks relating to the management of software entities executing on the computing device 104 (and additional computing devices 188, if the controller 112 is managing multiple computing devices, such as in a data center environment). The power estimator 172 provides the software entity power consumption for software entities executing on the computing device 104 to the controller 112. The telemetry agent 168 and/or the power estimator 172 can provide any of the telemetry information 164 to the controller 112.

The controller 112 can utilize software entity power consumption information in various manners. For example, if a power limit of an integrated circuit component (e.g., the TDP of an integrated circuit component) of the computing device 104 has been exceeded or close to being exceeded, the controller 112 can cause one or more actions to be taken at the computing device 104 to reduce the power consumption of the integrated circuit component. In a first example of an action that can be taken, the controller 112 can determine, based on the software entity power consumption for a software entity, that moving the software entity from a first integrated circuit component to a second integrated circuit component will result in the power consumption of the first integrated circuit component no longer exceeding a power limit of the first integrated circuit component. The controller 112 can further determine that the software entity power consumption of the software entity to be moved fits within an available power budget of a second integrated circuit component (an amount of power between a power limit of the second integrated circuit component and a current power consumption of the second integrated circuit component) and move the software entity from the first integrated circuit component to the second integrated circuit component. The second integrated circuit component can be on the same computing device or a different computing device as the first integrated circuit component.

In a second example of an action that can be taken, the controller 112 can determine, based on the integrated circuit component power consumption that a power limit of the integrated circuit component has been exceeded, select a first software entity from among a plurality of software entities executing on the integrated circuit component for reduced power consumption based on the software entity power consumption of the first software entity; and reduce the operating frequency of one of the physical processor units on which the first software entity is executing to reduce the power consumption of the integrated circuit component. The controller 112 can cause an action to be taken at the computing device 104 by supplying control information 186 to the computing device 104.

The controller 112 can utilize the software entity power consumption for various software entities for additional purposes, such as reporting and billing. For example, the controller 112 can generate a report comprising software entity power consumption and software entity identifying information (e.g., software entity name) to a computing device or an electronic messaging account (e.g., email) associated with a user entity. As used herein, the term "user entity" can refer to a user or a group of users, or a business, government, academic, or another type of entity. In another example, the controller 112 can generate a power usage report indicating how much power is being consumed by software entities associated with a user entity, such as applications associated with a client of a hosted data center that are running on the hosted data center infrastructure.

Such reports can be beneficial to a user entity that, for example, desires to audit the amount of power consumed by their applications operating on a data center to determine a carbon footprint associated with executing their applications on a provider's computing infrastructure. If the software entity consumption information is for an application that is part of a network slice, the controller 112 can sum the software entity power consumptions for applications that comprise a network slice and report a total software entity power consumption for a network slice operating on a computing system (or across multiple computing systems). As used herein, the term "network slice" refers to a logical or virtualized network operating on a physical network structure and can comprise applications responsible for network slice implementation (e.g., application that comprise the service or network function layer of the network slice) or network slice control or orchestration. Reports can be generated at periodic intervals (e.g., N seconds, minutes, hours, or days), other intervals, or in response to a request for a power consumption report.

In another example, the controller 112 can determine an amount to be billed to a user entity based on software entity power consumption for software entities associated with the user entity. The controller 112 can send information indicating the amount to be billed to a computing device or an electronic communication account associated with the user entity. In some embodiments, a component of the computing system 100 other than the controller 112 can generate reports comprises software entity power consumption and perform billing tasks utilizing software entity power consumption information. The reporting functions described herein can be performed by the user entity, the operator of the facilities upon which the user entity's software entities are executing, or another entity.

In some embodiments, a software entity can be associated with a user entity via a user identifier. The user identifier can be a number, alphanumeric string, or other information suitable for identifying a user entity. In some embodiments, the user identifier associated with a software entity can be provided to the computing device 104 when the software entity is sent to the computing device 104 for execution. The telemetry information 164 can comprise the user identifier for a software entity if the telemetry information 164 comprises metrics pertaining to a software entity, such as the utilization of a virtual processor unit, memory controller, or interconnect controller by a software entity. The power estimator 172 can store the user identifier, and software entity power consumption for a software entity in the database 184 after determining the software entity power consumption for a software entity. The power estimator 172 can provide the user identifier for a software entity to the controller 112 when providing the software entity power consumption for the software entity to the controller. Similarly, a network slice identifier can be used to associate multiple software entities comprising a network slice to allow for the reporting of total power consumption by a network slice operating on a computing device (or across multiple computing devices) and to allow for a user entity to be billed based on the total power consumption by a network slice.

In some embodiments, software entity identifying information is used to associate a software entity with a user entity based on software power consumption information. A software entity identifier can be, for example, a process identifier, a number, an alphanumeric string, or any other information suitable for software entity identification. In some embodiments, the software entity identifier associated with a software entity can be provided to the computing device 104 when the software entity is sent to the computing device 104 for execution. The telemetry information 164 can comprise the software entity identifier for a software entity if the telemetry information 164 comprises metrics pertaining to a software entity, such as the utilization of a virtual processor unit, memory controller, or interconnect controller by a software entity. The power estimator 172 can store the software entity identifier, and software entity power consumption for a software entity in the database 184 after determining the software entity power consumption for a software entity. The power estimator 172 can provide the software entity identifier for a software entity to the controller 112 when providing the software entity power consumption for the software entity to the controller.

In some embodiments, the controller 112 can enforce policies for software entities associated with a user entity. For example, the controller 112 can manage software entities associated with a user entity such that a total power consumed by the software entities stays within a power budget. The controller 112 can sum the software entity power consumptions for software entities executing on computing devices managed by the controller 112 and associated with a user entity to generate a total software entity power consumption for the user entity. If the total software entity power consumption exceeds a power budget (which can be a power budget associated with the user entity or a general power budget not associated with a particular user entity), the controller 112 can take an action or cause an action to be taken to reduce the total power consumption. Actions that can be taken to reduce the total power consumption include, for example, terminating execution of a software entity, reducing the operating frequency of one or more processor units on which a software entity is executing, moving a software entity from a first integrated circuit component to a second integrated circuit component, or moving a software entity from a first processor unit to a second processor unit. Moving a software entity from a first integrated circuit component to a second integrated circuit component or a first processor unit to a second processor unit can reduce the software entity power consumption due to, for example, the second integrated circuit component or processor unit having a lower base frequency than the first integrated circuit component or first processor unit.

By being able to account for power consumption at the software entity level, a controller can take actions with respect to individual software entities associated with a user entity to keep the total software entity power consumption for a user entity within the power budget and allow the remaining software entities to continue executing at their current power consumption levels. Various approaches can be taken to determine which software entities are to be selected for power reduction, such as selecting the software entities for power reductions that would result in the fewest number of software entities associated with the user entity having their power consumption levels reduced, selecting one or more software entities with the largest software entity power consumption from among the software entities associated with the user entity, or selecting one or more software entities for power reduction that have a priority lower than that of one or more other software entities associated with the user entity so that software entities having a higher priority continue executing without having their performance throttled down. The priority of a software entity can be assigned by the controller 112 and be based on, for example, the type of software entity, a priority assigned to the software entity by the user entity or in another manner.

In some embodiments, if the total software entity power consumption is less than the power budget, the controller 112 can take an action or cause an action to be taken to increase the power consumption of one or more of the software entities associated with the user entity such that the total software entity power consumption stays within the user entity power budget. This may be advantageous where, for example, a user entity wishes to take full advantage of their available power budget. For example, the controller 112 can determine how many additional instances of one or more software entities can be initiated based on a difference between the total software entity power consumption and the user entity power budget and initiate execution of the additional instances of the one or more software entities. In another example, the controller 112 can determine how much the operating frequency of a processor unit on which a software entity is executing can be increased based on the difference between the total software entity power consumption and the user entity power budget and increase the operating frequency of the processor unit accordingly. Other actions that the controller 112 can take to increase power of a software entity while keeping the total software entity power consumption within a user entity power budget include moving a software entity from a first integrated circuit component to a second integrated circuit component that is a higher performance integrated circuit component than the first integrated circuit component or from a first processor unit to a second processor unit that is a higher performance processor unit than the first processor unit.

Thus, the technologies described herein can allow for the dynamic management of software entities associated with a user entity to keep a total software entity power consumption within a power budget. That is, different software entities can be selected for power reduction (or power increase) at different times as the power consumption of software entities varies during execution.

The power estimator 172 can determine software entity power consumption information at any periodic or another interval. For example, the power estimator can determine software entity power consumption information at intervals of N seconds, minutes, hours, days, etc. The power estimator 172 can provide the software entity power consumption to the controller 112 at any periodic or another interval, and the interval at which the power estimator 172 provides information to the controller 112 can be different or the same as the interval at which it determines the software entity power consumptions. The controller 112 can determine whether an action is to be taken based on the software entity power consumption information received over any periodic or another time interval.

Although enforcement of a user entity power budget policy has been described as being performed by the controller 112, in other embodiments, the monitoring and analytics system 108 and controller 112 can collectively enforce a user entity power budget.

Various components of the controller 112 can cause an action to be taken. In embodiments where the computing system 100 is operating an NFV environment, the controller 112 can comprise an NFVO (NFV orchestrator) 194, a VIM (virtualized infrastructure manager) 196, and a VNFM (virtual network function manager) 198. Together, the NFVO 194, VIM 196, and VNFM 198 can be part of an NFV-MANO (management and orchestration) framework 199. The NFVO 194 performs resource (storage, network, compute) orchestration and network service orchestration. In some embodiments, the NFVO can be an ONAP (Open Network Automation Platform), OSM (Open Source MANO), or VMware vCenter implementation. The VIM 196 controls and manages resources of the NFVI established on the computing device 104. It keeps an inventory of the allocation of virtual resources to physical resources, which allows for the orchestration of the allocation, upgrade, release, and reclamation of NFVI resources. In some embodiments, the VIM 196 can be an OpenStack, Kubernetes, or VMware vSphere implementation. The VNFM 198 manages the lifecycle of VNFs, handling such operations as VNF instantiation, scaling, update, and termination. An SDN (software defined networking) controller 190 can control the flow of information between VNFs deployed to the computing device 104. The SDN controller 190 is shown logically as a single unit but can be distributed across multiple components in the computing system 100.

In some embodiments, the controller 112 and the monitoring and analytics system 108 are separate from the computing device 104. As such, they operate on different computing devices than the computing device 104. In some embodiments, the controller 112 and monitoring and analytics system 108 can operate on the same computing device and in other embodiments, they can operate on different computing devices. Similarly, the components of the controller 112 can operate on the same computing device or across multiple computing devices. For example, the NFVO 194, VIM 196, and VNFM 198 can operate on a computing device dedicated to managing NFV operations for an entity, such as a network services provider and the SDN controller 190 can run on another computing device. In other embodiments, the NFVO 194, VIM 196, VNFM 198, and SDN controller 190 can operate on virtual machines deployed to separate computing devices.

The monitoring and analytics system 108 is shown as being separate from the controller 112 and the computing device 104. The power estimator 172 can be implemented as software, firmware, hardware, or a combination thereof. In some embodiments, the power estimator 172 can be located in the computing device 104. For example, the power estimator can be implemented as a software entity executing on one or more processor units of the computing device 104, as power estimator circuitry that is part of the platform resources 116, as firmware executing on an integrated circuit component or a baseboard management controller (BMC), or as part of a hypervisor or container engine. In some embodiments, the power estimator can be a component of the controller 112, such as a VNFM, NFVO, or SDN controller. In some embodiments, the power estimator can be implemented as an analytics function in a 3rd Generation Partnership Project (3GPP), such as a Network Data Analytics Function (NWDAF) or a Machine Data Analytics Function (MDAF), as will be described below. In some embodiments where the power estimator is implemented as a BMC or a platform controller, the power estimator can provide software entity power consumption information to the controller 112.

FIG. 2 illustrates a block diagram of an example computing system in which the power estimator is implemented as part of a 3GPP Network Data Analytics Function (NWDAF). The computing system 200 comprises a computing device 204 on which an application 236 is operating on virtual machine 228. The virtual machine 228 is operating on a hypervisor 224 that is in turn operating on an operating system 220. The operating system 220 is executing on the platform resources 216 (e.g., integrated circuit components) of the computing device 204. The application 236 is an element of a 3GPP 5G core infrastructure and part of a network slice. An NWDAF application agent 238 provides application telemetry 266, such as information indicating the utilization of the virtual processor unit on which the application 236 is executing to a power estimator 272 that is part of an NWDAF 284. Platform telemetry information 262 and virtualization telemetry information 264 are provided by the platform resources 216, the operating system 220, and the hypervisor 224 to a telemetry agent 268. The platform telemetry information 262 and the virtualization telemetry information 264 received by the telemetry agent 268 is provided to a NWDAF platform agent 270 as telemetry information 280 that provides the telemetry information 280 to a NWDAF 284. The power estimator 272 can determine software entity power consumption for a software entity, such as the virtual machine 228 and the application 236. The NWDAF 284 can aggregate the software entity power consumption for multiple applications that comprise a network slice. The NWDAF 284 can provide the software entity power consumption for the virtual machine 228, the application 236, or a network slice to which the application 236 belongs to other 5G core infrastructure elements, such as other network functions, applications functions, and other NWDAFs. The software entity power consumption can be used by a 5G network architecture to perform various power management related tasks, such as those discussed above with regard to FIG. 1, as well as in-network automation and service orchestration.

In some embodiments, a power estimator that can generate software entity power consumption for software entities in a 5G network can be implemented in a Management Data Analytics Function (MDAF) or Management Data Analytics Service (MDAS). Software entity power consumption information can be utilized by a 5G network to allow for the power-based management and orchestration of network resources at the software entity (virtual machine, container, application, network slice) level.

Figure 3:
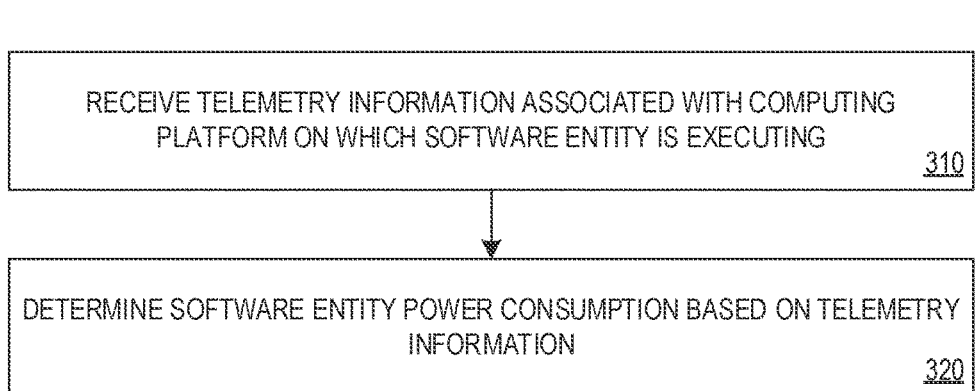
FIG. 3 is a flowchart of an example software entity power consumption estimation method.

FIG. 3 is a flowchart of an example software entity power consumption estimation method. The method 300 can be performed by, for example, a power estimator that is part of a management and orchestration system for a data center. At 310, telemetry information associated with a computing platform on which a software entity is executing is received, the computing platform comprising an integrated circuit component comprising a plurality of physical processor units and non-processor unit circuitry, the software entity executing on a virtual processor unit to which one or more of the physical processor units are allocated. At 320, a software entity power consumption for the software entity is determined based on the telemetry information.

In other embodiments, the method 300 can comprise one or more additional elements. For example, the method 300 can further determine that the software entity power consumption fits within an available power budget of a second integrated circuit component and cause the software entity to be moved from the first integrated circuit component to the second integrated circuit component.

In another example, the software entity is a first software entity and the software entity power consumption of the first software entity is a first software entity power consumption, the first software entity and one or more second software entities are associated with a user entity, individual of the second software entities having an associated second software entity power consumption, and the method 300 can further sum the first software entity power consumption and the second software entity power consumptions to generate a total software entity power consumption, determine that the total software entity power consumption exceeds a power budget; and cause an action to be taken to reduce the first software entity power consumption.

The technologies described herein can be performed by or implemented in any of a variety of computing systems, including mobile computing systems (e.g., smartphones, handheld computers, tablet computers, laptop computers, portable gaming consoles, 2-in-1 convertible computers, portable all-in-one computers), non-mobile computing systems (e.g., desktop computers, servers, workstations, stationary gaming consoles, set-top boxes, smart televisions, rack-level computing solutions (e.g., blade, tray, or sled computing systems)), and embedded computing systems (e.g., computing systems that are part of a vehicle, smart home appliance, consumer electronics product or equipment, manufacturing equipment). As used herein, the term "computing system" includes computing devices and includes systems comprising multiple discrete physical components. In some embodiments, the computing systems are located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves). Further, the computing systems in which the technologies disclosed herein can be implemented as part of a disaggregated computing solution (e.g., a rack-scale architecture solution) in which various computing resources types (e.g., compute, memory, network, storage) are pooled across multiple computing devices (e.g., at the data center level) and provisioned and deprovisioned on demand by a controller or orchestrator to accommodate application requirements.

Figure 4:
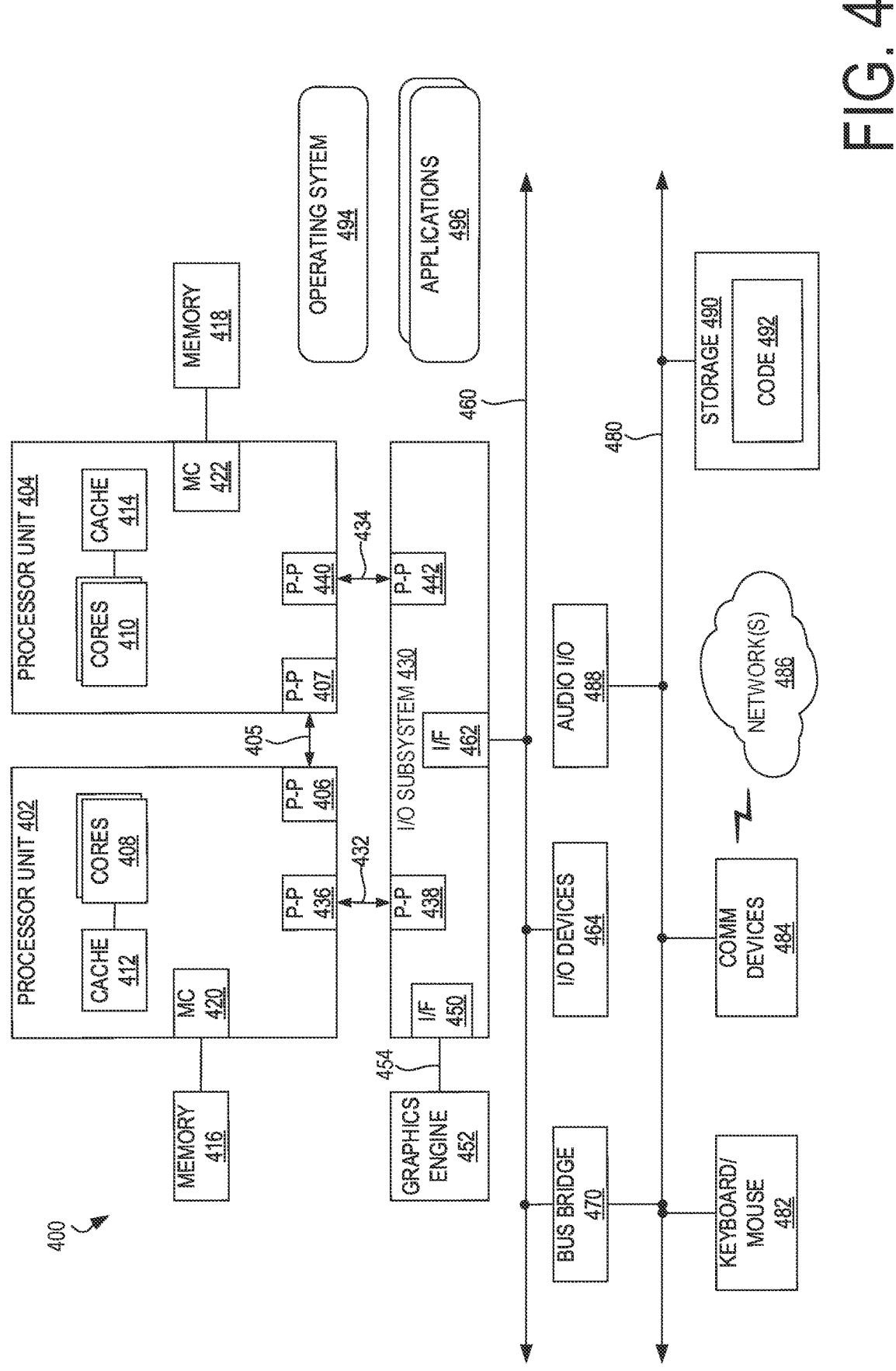
FIG. 4 is a block diagram of an example computing system in which technologies described herein may be implemented.

FIG. 4 is a block diagram of an example computing system in which technologies described herein may be implemented. Generally, components shown in FIG. 4 can communicate with other shown components, although not all connections are shown, for ease of illustration. The computing system 400 is a multiprocessor system comprising a first processor unit 402 and a second processor unit 404 comprising point-to-point (P-P) interconnects. A point-to-point (P-P) interface 406 of the processor unit 402 is coupled to a point-to-point interface 407 of the processor unit 404 via a point-to-point interconnection 405. It is to be understood that any or all of the point-to-point interconnects illustrated in FIG. 4 can be alternatively implemented as a multi-drop bus, and that any or all buses illustrated in FIG. 4 could be replaced by point-to-point interconnects.

The processor units 402 and 404 comprise multiple processor cores. Processor unit 402 comprises processor cores 408 and processor unit 404 comprises processor cores 410. Processor cores 408 and 410 can execute computer-executable instructions in a manner similar to that discussed below in connection with FIG. 5, or other manners.

Processor units 402 and 404 further comprise cache memories 412 and 414, respectively. The cache memories 412 and 414 can store data (e.g., instructions) utilized by one or more components of the processor units 402 and 404, such as the processor cores 408 and 410. The cache memories 412 and 414 can be part of a memory hierarchy for the computing system 400. For example, the cache memories 412 can locally store data that is also stored in a memory 416 to allow for faster access to the data by the processor unit 402. In some embodiments, the cache memories 412 and 414 can comprise multiple cache levels, such as level 1 (L1), level 2 (L2), level 3 (L3), level 4 (L4) and/or other caches or cache levels. In some embodiments, one or more levels of cache memory (e.g., L2, L3, L4) can be shared among multiple cores in a processor unit or multiple processor units in an integrated circuit component. In some embodiments, the last level of cache memory on an integrated circuit component can be referred to as a last level cache (LLC). One or more of the higher levels of cache levels (the smaller and faster caches) in the memory hierarchy can be located on the same integrated circuit die as a processor core and one or more of the lower cache levels (the larger and slower caches) can be located on integrated circuit dies that are physically separate from the processor core integrated circuit dies.

Although the computing system 400 is shown with two processor units, the computing system 400 can comprise any number of processor units. Further, a processor unit can comprise any number of processor cores. A processor unit can take various forms such as a central processing unit (CPU), a graphics processing unit (GPU), general-purpose GPU (GPGPU), accelerated processing unit (APU), field-programmable gate array (FPGA), neural network processing unit (NPU), data processor unit (DPU), accelerator (e.g., graphics accelerator, digital signal processor (DSP), compression accelerator, artificial intelligence (AI) accelerator), controller, or other types of processing units. As such, the processor unit can be referred to as an XPU (or xPU). Further, a processor unit can comprise one or more of these various types of processing units. In some embodiments, the computing system comprises one processor unit with multiple cores, and in other embodiments, the computing system comprises a single processor unit with a single core. As used herein, the terms "processor unit" and "processing unit" can refer to any processor, processor core, component, module, engine, circuitry, or any other processing element described or referenced herein.

In some embodiments, the computing system 400 can comprise one or more processor units that are heterogeneous or asymmetric to another processor unit in the computing system. There can be a variety of differences between the processing units in a system in terms of a spectrum of metrics of merit including architectural, microarchitectural, thermal, power consumption characteristics, and the like. These differences can effectively manifest themselves as asymmetry and heterogeneity among the processor units in a system.

The processor units 402 and 404 can be located in a single integrated circuit component (such as a multi-chip package (MCP) or multi-chip module (MCM)) or they can be located in separate integrated circuit components. An integrated circuit component comprising one or more processor units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processor unit, or on one or more integrated circuit dies separate from the integrated circuit dies comprising the processor units. In some embodiments, these separate integrated circuit dies can be referred to as "chiplets". In some embodiments where there is heterogeneity or asymmetry among processor units in a computing system, the heterogeneity or asymmetric can be among processor units located in the same integrated circuit component. In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Processor units 402 and 404 further comprise memory controller logic (MC) 420 and 422. As shown in FIG. 4, MCs 420 and 422 control memories 416 and 418 coupled to the processor units 402 and 404, respectively. The memories 416 and 418 can comprise various types of volatile memory (e.g., dynamic random-access memory (DRAM), static random-access memory (SRAM)) and/or non-volatile memory (e.g., flash memory, chalcogenide-based phase-change non-volatile memories), and comprise one or more layers of the memory hierarchy of the computing system. While MCs 420 and 422 are illustrated as being integrated into the processor units 402 and 404, in alternative embodiments, the MCs can be external to a processor unit.

Processor units 402 and 404 are coupled to an Input/Output (I/O) subsystem 430 via point-to-point interconnections 432 and 434. The point-to-point interconnection 432 connects a point-to-point interface 436 of the processor unit 402 with a point-to-point interface 438 of the I/O subsystem 430, and the point-to-point interconnection 434 connects a point-to-point interface 440 of the processor unit 404 with a point-to-point interface 442 of the I/O subsystem 430. Input/Output subsystem 430 further includes an interface 450 to couple the I/O subsystem 430 to a graphics engine 452. The I/O subsystem 430 and the graphics engine 452 are coupled via a bus 454.

The Input/Output subsystem 430 is further coupled to a first bus 460 via an interface 462. The first bus 460 can be a Peripheral Component Interconnect Express (PCIe) bus or any other type of bus. Various I/O devices 464 can be coupled to the first bus 460. A bus bridge 470 can couple the first bus 460 to a second bus 480. In some embodiments, the second bus 480 can be a low pin count (LPC) bus. Various devices can be coupled to the second bus 480 including, for example, a keyboard/mouse 482, audio I/O devices 488, and a storage device 490, such as a hard disk drive, solid-state drive, or another storage device for storing computer-executable instructions (code) 492 or data. The code 492 can comprise computer-executable instructions for performing methods described herein. Additional components that can be coupled to the second bus 480 include communication device(s) 484, which can provide for communication between the computing system 400 and one or more wired or wireless networks 486 (e.g. Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

In embodiments where the communication devices 484 support wireless communication, the communication devices 484 can comprise wireless communication components coupled to one or more antennas to support communication between the computing system 400 and external devices. The wireless communication components can support various wireless communication protocols and technologies such as Near Field Communication (NFC), IEEE 802.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM), and 5G broadband cellular technologies. In addition, the wireless modems can support communication with one or more cellular networks for data and voice communications within a single cellular network, between cellular networks, or between the computing system and a public switched telephone network (PSTN).

The system 400 can comprise removable memory such as flash memory cards (e.g., SD (Secure Digital) cards, memory sticks, Subscriber Identity Module (SIM) cards). The memory in system 400 (including caches 412 and 414, memories 416 and 418, and storage device 490) can store data and/or computer-executable instructions for executing an operating system 494 and application programs 496. Example data includes web pages, text messages, images, sound files, and video to be sent to and/or received from one or more network servers or other devices by the system 400 via the one or more wired or wireless networks 486, or for use by the system 400. The system 400 can also have access to external memory or storage (not shown) such as external hard drives or cloud-based storage.

The operating system 494 can control the allocation and usage of the components illustrated in FIG. 4 and support the one or more application programs 496. The application programs 496 can include common computing system applications (e.g., email applications, calendars, contact managers, web browsers, messaging applications) as well as other computing applications.

The computing system 400 can support various additional input devices, such as a touchscreen, microphone, monoscopic camera, stereoscopic camera, trackball, touchpad, trackpad, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to, or removably attachable with the system 400. External input and output devices can communicate with the system 400 via wired or wireless connections.

In addition, the computing system 400 can provide one or more natural user interfaces (NUIs). For example, the operating system 494 or applications 496 can comprise speech recognition logic as part of a voice user interface that allows a user to operate the system 400 via voice commands. Further, the computing system 400 can comprise input devices and logic that allows a user to interact with computing the system 400 via body, hand, or face gestures.

The system 400 can further include at least one input/output port comprising physical connectors (e.g., USB, IEEE 1394 (FireWire), Ethernet, RS-232), a power supply (e.g., battery), a global satellite navigation system (GNSS) receiver (e.g., GPS receiver); a gyroscope; an accelerometer; and/or a compass. A GNSS receiver can be coupled to a GNSS antenna. The computing system 400 can further comprise one or more additional antennas coupled to one or more additional receivers, transmitters, and/or transceivers to enable additional functions.

In addition to those already discussed, integrated circuit components, integrated circuit constituent components, and other components in the computing system 400 can communicate with interconnect technologies such as Intel® QuickPath Interconnect (QPI), Intel® Ultra Path Interconnect (UPI), Compute Express Link (CXL), cache coherent interconnect for accelerators (CCIX®), serializer/deserializer (SERDES), Nvidia® NVLink, ARM Infinity Link, Gen-Z, or Open Coherent Accelerator Processor Interface (OpenCAPI). Other interconnect technologies may be used and a computing system 400 may utilize one or more interconnect technologies.

It is to be understood that FIG. 4 illustrates only one example computing system architecture. Computing systems based on alternative architectures can be used to implement technologies described herein. For example, instead of the processors 402 and 404 and the graphics engine 452 being located on discrete integrated circuits, a computing system can comprise an SoC (system-on-a-chip) integrated circuit incorporating multiple processors, a graphics engine, and additional components. Further, a computing system can connect its constituent component via bus or point-to-point configurations different from that shown in FIG. 4. Moreover, the illustrated components in FIG. 4 are not required or all-inclusive, as shown components can be removed and other components added in alternative embodiments.

Figure 5:
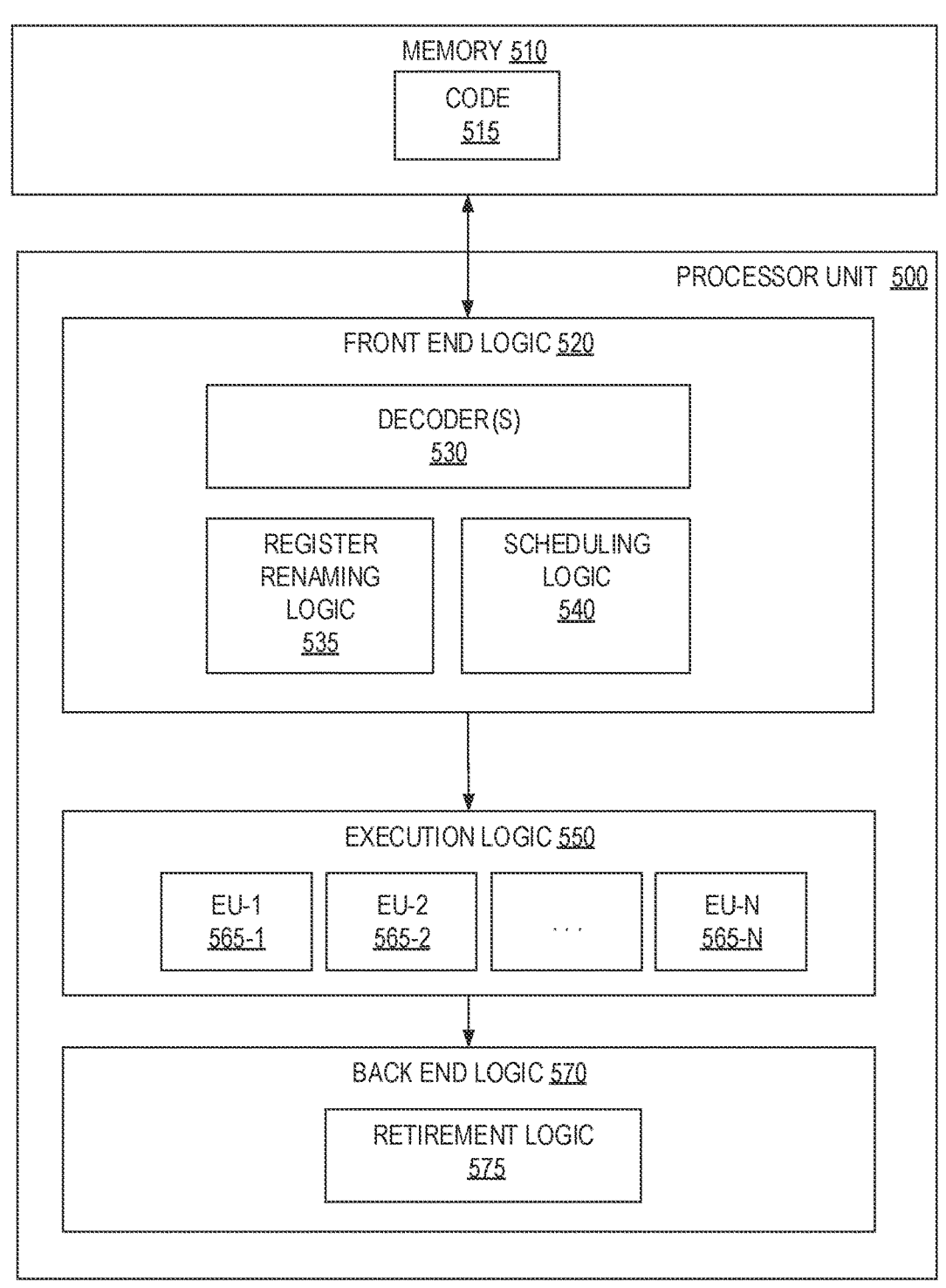
FIG. 5 is a block diagram of an example processor unit that can execute instructions as part of implementing technologies described herein.

FIG. 5 is a block diagram of an example processor unit 500 to execute computer-executable instructions as part of implementing technologies described herein. The processor unit 500 can be a single-threaded core or a multithreaded core in that it may include more than one hardware thread context (or "logical processor") per processor unit.

FIG. 5 also illustrates a memory 510 coupled to the processor unit 500. The memory 510 can be any memory described herein or any other memory known to those of skill in the art. The memory 510 can store computer-executable instructions 515 (code) executable by the processor unit 500.

The processor unit comprises front-end logic 520 that receives instructions from the memory 510. An instruction can be processed by one or more decoders 530. The decoder 530 can generate as its output a micro-operation such as a fixed width micro operation in a predefined format, or generate other instructions, microinstructions, or control signals, which reflect the original code instruction. The front-end logic 520 further comprises register renaming logic 535 and scheduling logic 540, which generally allocate resources and queues operations corresponding to converting an instruction for execution.

The processor unit 500 further comprises execution logic 550, which comprises one or more execution units (EUs) 565-1 through 565-N. Some processor unit embodiments can include a number of execution units dedicated to specific functions or sets of functions. Other embodiments can include only one execution unit or one execution unit that can perform a particular function. The execution logic 550 performs the operations specified by code instructions. After completion of execution of the operations specified by the code instructions, back-end logic 570 retires instructions using retirement logic 575. In some embodiments, the processor unit 500 allows out of order execution but requires in-order retirement of instructions. Retirement logic 575 can take a variety of forms as known to those of skill in the art (e.g., re-order buffers or the like).

The processor unit 500 is transformed during execution of instructions, at least in terms of the output generated by the decoder 530, hardware registers and tables utilized by the register renaming logic 535, and any registers (not shown) modified by the execution logic 550.

Any of the disclosed methods (or a portion thereof) can be implemented as computer-executable instructions or a computer program product. Such instructions can cause a computing system or one or more processor units capable of executing computer-executable instructions to perform any of the disclosed methods. As used herein, the term "computer" refers to any computing system, device, or machine described or mentioned herein as well as any other computing system, device, or machine capable of executing instructions. Thus, the term "computer-executable instruction" refers to instructions that can be executed by any computing system, device, or machine described or mentioned herein as well as any other computing system, device, or machine capable of executing instructions.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory) optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some embodiments, any of the methods herein can be performed by a combination of non-programmable hardware components and one or more processing units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

As used in this application and the claims, a list of items joined by the term "and/or" can mean any combination of the listed items. For example, the phrase "A, B and/or C" can mean A; B; C; A and B; A and C; B and C; or A, B and C. As used in this application and the claims, a list of items joined by the term "at least one of" can mean any combination of the listed terms. For example, the phrase "at least one of A, B or C" can mean A; B; C; A and B; A and C; B and C; or A, B, and C. Moreover, as used in this application and the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses, and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The following examples pertain to additional embodiments of technologies disclosed herein.

Example 1 is a method comprising: receiving telemetry information associated with a computing platform on which a software entity is executing, the computing platform comprising an integrated circuit component comprising a plurality of physical processor units and non-processor unit circuitry, the software entity executing on a virtual processor unit to which one or more of the physical processor units are allocated; and determining a software entity power consumption for the software entity based on the telemetry information.

Example 2 comprises the method of example 1, wherein the telemetry information comprises information indicating an integrated circuit component power consumption and determining the software entity power consumption comprises: determining a per-processor unit power consumption based on the integrated circuit component power consumption and a number of physical processor units in the plurality of physical processor units; and determining the software entity power consumption by scaling the per-processor unit power consumption by a sum of a processor unit power consumption scaling factor indicating a portion of integrated circuit component power consumed by the plurality of the physical processor units and a non-processor unit circuitry power consumption scaling factor indicating a portion of integrated circuit component power consumed by the non-processor unit circuitry.

Example 3 comprises the method of example 2, wherein the telemetry information further comprises one or more of the following: physical processor unit active information, information indicating an operating frequency for individual of the physical processor units, information indicating a reference operating frequency of the integrated circuit component, and utilization of the virtual processor unit by the software entity, and wherein the determining the software entity power consumption further comprises scaling the processor unit power consumption scaling factor by one or more of the following: a physical processor unit active scaling factor indicating a portion of time that a physical processor unit on which the software entity is executing is in an active state that is based on the physical processor unit active information, a physical processor unit operating frequency scaling based on the reference operating frequency of the integrated circuit component and the operating frequency of the individual physical processor units, a virtual processor unit-to-physical processor unit scaling factor indicating a number of the physical processor units allocated to the virtual processor unit, and a virtual processor unit utilization scaling factor indicating a utilization of a virtual processor unit on which the software entity is executing that is based on the utilization of the virtual processor unit by the software entity.

Example 4 comprises the method of example 2, wherein the non-processor unit circuitry comprises a memory controller and an interconnect controller, wherein the telemetry information further comprises one or more of the following: information indicating one or more operating frequencies of the non-processor unit circuitry, information indicating a reference operating frequency of the integrated circuit component, information indicating an operating frequency of the memory controller, information indicating a utilization of a memory external to the integrated circuit component by the software entity, information indicating an operating frequency of the interconnect controller, information indicating utilization of the interconnect controller by the software entity, and utilization of the virtual processor unit by the software entity, and wherein the determining the software entity power consumption further comprises scaling the non-processor unit circuitry power consumption scaling factor by one or more of the following: a non-processor unit circuitry operating frequency scaling factor based on the reference operating frequency of the integrated circuit component and the one or more operating frequencies of the non-processor unit circuitry, a memory controller operating frequency scaling factor based on the reference operating frequency of the integrated circuit component and the operating frequency of the memory controller, a memory utilization scaling factor based on the memory utilization by the software entity, an interconnect controller operating frequency scaling factor based on the operating frequency of the interconnect controller, an interconnect controller utilization scaling factor based on the utilization of the interconnect controller by the software entity.

Example 5 comprises the method of example 1, wherein the telemetry information comprises information indicating an integrated circuit component power consumption, physical processor unit active information, and information indicating a utilization of the virtual processor unit by the software entity, wherein the software entity power consumption is determined according to the equation: $P_{swe}=P_{ppu}(SF_{pu}\ SF_{pu\_active}\ SF_{vpu\_ppu}\ SF_{util\_vpu}+SF_{npu})$, wherein $P_{swe}$ is the software entity power consumption, wherein $P_{ppu}$ is a per-processor unit power consumption based on the integrated circuit component power consumption and a number of physical processor units in the plurality of physical processor units, wherein $SF_{pu}$ is a processor unit power consumption scaling factor indicating a portion of integrated circuit component power consumed by the plurality of the physical processor units, wherein $SF_{pu\_active}$ is a physical processor unit active scaling factor indicating a portion of time that a physical processor unit on which the software entity is executing is in an active state and $SF_{pu\_active}$ is based on the physical processor unit active information, wherein $SF_{vpu\_ppu}$ is a virtual processor unit-to-physical processor unit scaling factor indicating a number of the physical processor units allocated to the virtual processor unit, wherein $SF_{util\_vpu}$ is a virtual processor unit utilization scaling factor indicating a utilization of the virtual processor unit by the software entity and $SF_{util\_vpu}$ is based on the utilization of the virtual processor unit by the software entity, and wherein $SF_{npu}$ is a non-processor unit circuitry power consumption scaling factor indicating a portion of integrated circuit component power consumed by the non-processor unit circuitry.

Example 6 comprises the method of example 1, wherein the information indicating utilization of the virtual processor unit by the software entity comprises information indicating DPDK busyness.

Example 7 comprises the method of example 1, wherein the telemetry information comprises information indicating integrated circuit component power consumption, physical processor unit active information, physical processor unit idle information, and information indicating a utilization of the virtual processor unit by the software entity, and wherein the software entity power consumption is determined according to the equation $P_{swe}=P_{ppu}(SF_{pu}\ SF_{pu\_active}\ SF_{vpu\_ppu}\ SF_{util\_vpu}+SF_{npu})$, wherein $P_{swe}$ is the software entity power consumption, wherein $P_{ppu}$ is a per-processor unit power consumption based on the integrated circuit component power consumption and a number of physical processor units in the plurality of physical processor units, wherein $SF_{pu}$ is a processor unit power consumption scaling factor indicating a portion of integrated circuit component power consumed by the plurality of the physical processor units, wherein $SF_{pu\_active}$ is a physical processor unit active scaling factor indicating a portion of time that a physical processor unit on which the software entity is executing is in an active state or in an idle state that is shallower than a threshold idle state, and $SF_{pu\_active}$ is based on the physical processor unit active information and the physical processor unit idle information, wherein $SF_{vpu\_ppu}$ is a virtual processor unit-to-physical processor unit scaling factor indicating a number of the physical processor units allocated to the virtual processor unit, wherein $SF_{util\_vpu}$ is a virtual processor unit utilization scaling factor indicating a utilization of a virtual processor unit on which the software entity is executing and $SF_{util\_vpu}$ is based on the utilization of the virtual processor unit by the software entity, and wherein $SF_{npu}$ is a non-processor unit circuitry power consumption scaling factor indicating a portion of integrated circuit component power consumed by non-processor unit circuitry.

Example 8 comprises the method of example 1, wherein the telemetry information comprises information indicating an integrated circuit component power consumption, physical processor unit active information, information indicating a reference operating frequency of the integrated circuit component, information indicating an operating frequency of individual of the one or more physical processor units allocated to the virtual processor unit, and information indicating a utilization of the virtual processor unit by the software entity, wherein the software entity power consumption is determined according to the equation $P_{swe}=P_{ppu}(SF_{pu}\ SF_{pu\_active}\ SF_{vpu\_ppu}\ SF_{util\_vpu}SF_{pu\_freq}+SF_{npu})$, wherein $P_{swe}$ is the software entity power consumption, wherein $P_{ppu}$ is a per-processor unit power consumption based on the integrated circuit component power consumption and a number of physical processor units in the plurality of physical processor units, wherein $SF_{pu}$ is a processor unit power consumption scaling factor indicating a portion of integrated circuit component power consumed by the plurality of the physical processor units, wherein $SF_{pu\_active}$ is a processor unit active scaling factor indicating a portion of time that a physical processor unit on which the software entity is executing is in an active state or an idle that is a shallower idle than a threshold idle state, and $SF_{pu\_active}$ is based on the physical processor unit active information, wherein $SF_{vpu\_ppu}$ is a virtual processor unit-to-physical processor unit scaling factor indicating a number of the physical processor units allocated to the virtual processor unit, wherein $SF_{util\_vpu}$ is a virtual processor unit utilization scaling factor indicating a utilization of a virtual processor unit on which the software entity is executing and $SF_{util\_vpu}$ is based on the utilization of the virtual processor unit by the software entity, wherein $SF_{pu\_freq}$ is a processor unit operating frequency scaling based on the reference operating frequency of the integrated circuit component and the operating frequency of the individual one or more physical processor units allocated to the virtual processor unit, and wherein $SF_{npu}$ is a non-processor unit circuitry power consumption scaling factor indicating a portion of integrated circuit component power consumed by non-processor unit circuitry.

Example 9 comprises the method of example 1, wherein the telemetry information comprises information indicating an integrated circuit component power consumption, physical processor unit active information, information indicating a reference operating frequency of the integrated circuit component, information indicating one or more operating frequencies of the non-processor unit circuitry, and information indicating a utilization of the virtual processor unit by the software entity, wherein the software entity power consumption is determined according to the equation $P_{swe}=P_{ppu}(SF_{pu} \quad SF_{pu\_active}SF_{vpu\_ppu} \quad SF_{util\_vpu}+SF_{npu} \quad SF_{npu\_freq})$, wherein $P_{swe}$ is the software entity power consumption, wherein $P_{ppu}$ is a per-processor unit power consumption based on the integrated circuit component power consumption and a number of physical processor units in the plurality of physical processor units, wherein $SF_{pu}$ is a processor unit power consumption scaling factor indicating a portion of integrated circuit component power consumed by the plurality of the physical processor units, wherein $SF_{pu\_active}$ is a physical processor unit active scaling factor indicating a portion of time that a physical processor unit on which the software entity is executing is in an active state and $SF_{pu\_active}$ is based on the physical processor unit active information, wherein $SF_{vpu\_ppu}$ is a virtual processor unit-to-physical processor unit scaling factor indicating a number of the physical processor units allocated to the virtual processor unit, wherein $SF_{util\_vpu}$ is a virtual processor unit utilization scaling factor indicating a utilization of a virtual processor unit on which the software entity is executing and $SF_{util\_vpu}$ is based on the information indicating utilization of the virtual processor unit by the software entity, wherein $SF_{npu}$ is a non-processor unit circuitry power consumption scaling factor indicating a portion of integrated circuit component power consumed by non-processor unit circuitry, and wherein $SF_{npu\_freq}$ is a non-processor unit circuitry operating frequency scaling factor based on the information indicating a reference operating frequency of the integrated circuit component and the information indicating the one or more operating frequencies of the non-processor unit circuitry.

Example 10 comprises the method of example 1, wherein the non-processor unit circuitry comprises a memory controller, wherein the telemetry information comprises information indicating an integrated circuit component power consumption, physical processor unit active information, information indicating a reference operating frequency of the integrated circuit component, information indicating an operating frequency of the memory controller, and information indicating a utilization of the virtual processor unit by the software entity, wherein the software entity power consumption is determined according to the equation $P_{swe}=P_{ppu}(SF_{pu} \quad SF_{pu_{active}}SF_{vpu\_ppu} \quad SF_{util\_vpu}+SF_{npu} \quad SF_{mem\_freq})$, wherein $P_{swe}$ is the software entity power consumption, wherein $P_{ppu}$ is a per-processor unit power consumption based on the integrated circuit component power consumption and a number of physical processor units in the plurality of physical processor units, wherein $SF_{pu}$ is a processor unit power consumption scaling factor indicating a portion of integrated circuit component power consumed by the plurality of the physical processor units, wherein $SF_{pu\_active}$ is a physical processor unit active scaling factor indicating a portion of time that a physical processor unit on which the software entity is executing is in an active state and $SF_{pu\_active}$ is based on the physical processor unit active information, wherein $SF_{vpu\_ppu}$ is a virtual processor unit-to-physical processor unit scaling factor indicating a number of the physical processor units allocated to the virtual processor unit, wherein $SF_{util\_vpn}$ is a virtual processor unit utilization scaling factor indicating a utilization of a virtual processor unit on which the software entity is executing and $SF_{util\_vpu}$ is based on the utilization of the virtual processor unit by the software entity, wherein $SF_{npu}$ is a non-processor unit circuitry power consumption scaling factor indicating a portion of integrated circuit component power consumed by non-processor unit circuitry, and wherein $SF_{mem\_freq}$ is a memory controller operating frequency scaling factor based on the reference operating frequency of the integrated circuit component and the operating frequency of the memory controller.

Example 11 comprises the method of example 1, wherein the telemetry information comprises information indicating an integrated circuit component power consumption, physical processor unit active information, information indicating utilization of a memory external to the integrated circuit component by the software entity, and information indicating a utilization of the virtual processor unit by the software entity, wherein the software entity power consumption is determined according to the equation $P_{swe}=P_{ppu}(SF_{pu} \quad SF_{pu\_active}SF_{vpu\_ppu} \quad SF_{util\_vpu}+SF_{npu} \quad SF_{mem\_util})$, wherein $P_{swe}$ is the software entity power consumption, wherein $P_{ppu}$ is a per-processor unit power consumption based on the integrated circuit component power consumption and a number of physical processor units in the plurality of physical processor units, wherein $SF_{pu}$ is a processor unit power consumption scaling factor indicating a portion of integrated circuit component power consumed by the plurality of the physical processor units, wherein $SF_{pu\_active}$ is a physical processor unit active scaling factor indicating a portion of time that a physical processor unit on which the software entity is executing is in an active state and $SF_{pu\_active}$ is based on the physical processor unit active information, wherein $SF_{vpu\_ppu}$ is a virtual processor unit-to-physical processor unit scaling factor indicating a number of the physical processor units allocated to the virtual processor unit, wherein $SF_{util\_vpu}$ is a virtual processor unit utilization scaling factor indicating a utilization of a virtual processor unit on which the software entity is executing and $SF_{util\_vpu}$ is based on the utilization of the virtual processor unit by the software entity, wherein $SF_{npu}$ is a non-processor unit circuitry power consumption scaling factor indicating a portion of integrated circuit component power consumed by non-processor unit circuitry, and wherein $SF_{mem\_util}$ is a memory utilization scaling factor based on the utilization of the memory by the software entity.

Example 12 comprises the method of example 11, wherein the telemetry information further comprises information indicating utilization of the memory by one or more additional software entities executing on the integrated circuit component and $SF_{mem\_util}$ is further based on the utilization of the memory by the one or more additional software entities.

Example 13 comprises the method of example 1, wherein the non-processor unit circuitry comprises an interconnect controller, wherein the telemetry information comprises information indicating an integrated circuit component power consumption, physical processor unit active information, information indicating a reference operating frequency of the integrated circuit component, information indicating an operating frequency of the interconnect controller, and information indicating a utilization of the virtual processor unit by the software entity, wherein the software entity power consumption is determined according to the equation $P_{swe}=P_{ppu}(SF_{pu} \quad SF_{pu\_active}SF_{vpu\_ppu} \quad SF_{util\_vpu}+SF_{npu}S-F_{IC\_freq})$, wherein $P_{swe}$ is the software entity power consumption, wherein $P_{ppu}$ is a per-processor unit power consumption based on the integrated circuit component power consumption and a number of physical processor units in the plurality of physical processor units, wherein $SF_{pu}$ is a processor unit power consumption scaling factor indicating a portion of integrated circuit component power consumed by the plurality of the physical processor units, wherein $SF_{pu\_active}$ is a physical processor unit active scaling factor indicating a portion of time that a physical processor unit on which the software entity is executing is in an active state and $SF_{pu\_active}$ is based on the physical processor unit active information, wherein $SF_{vpu\_ppu}$ is a virtual processor unit-to-physical processor unit scaling factor indicating a number of the physical processor units allocated to the virtual processor unit, wherein $SF_{util\_ppu}$ is a virtual processor unit utilization scaling factor indicating a utilization of a virtual processor unit on which the software entity is executing and $SF_{util\_vpu}$ is based on the information indicating utilization of the virtual processor unit by the software entity, wherein $SF_{npu}$ is a non-processor unit circuitry power consumption scaling factor indicating a portion of integrated circuit component power consumed by non-processor unit circuitry, and wherein $SF_{IC\_freq}$ is an interconnect controller operating frequency scaling factor based on the operating frequency of the interconnect controller.

Example 14 comprises the method of example 1, wherein the non-processor unit circuitry comprises an interconnect controller, wherein the telemetry information comprises information indicating an integrated circuit component power consumption, physical processor unit active information, information indicating a reference operating frequency of the integrated circuit component, information indicating utilization of the interconnect controller by the software entity, and utilization of the virtual processor unit by the software entity, wherein the software entity power consumption is determined according to the equation $P_{swe}=P_{ppu}(SF_{pu} \quad SF_{pu\_active}SF_{vpu\_ppu} \quad SF_{util\_vpu}+SF_{npu}SF_{IC\_util})$, wherein $P_{swe}$ is the software entity power consumption, wherein $P_{ppu}$ is a per-processor unit power consumption based on the integrated circuit component power consumption and a number of physical processor units in the plurality of physical processor units, wherein $SF_{pu}$ is a physical processor unit power consumption scaling factor indicating a portion of integrated circuit component power consumed by the plurality of the physical processor units, wherein $SF_{pu\_active}$ is a physical processor unit active scaling factor indicating a portion of time that a physical processor unit on which the software entity is executing is in an active state and $SF_{pu\_active}$ is based on the physical processor unit active information, wherein $SF_{vpu\_ppu}$ is a virtual processor unit-to-physical processor unit scaling factor indicating a number of the physical processor units allocated to the virtual processor unit, wherein $SF_{util\_vpu}$ is a virtual processor unit utilization scaling factor indicating a utilization of a virtual processor unit on which the software entity is executing and $SF_{util\_vpu}$ is based on the information indicating utilization of the virtual processor unit by the software entity, wherein $SF_{npu}$ is a non-processor unit circuitry power consumption scaling factor indicating a portion of integrated circuit component power consumed by non-processor unit circuitry, and wherein $SF_{IC\_util}$ is an interconnect controller utilization scaling factor based on the information indicating utilization of the interconnect controller by the software entity.

Example 15 comprises the method of example 14, wherein the telemetry information further comprises information indicating utilization of the interconnect controller by one or more additional software entities executing on the integrated circuit component and $SF_{IC\_util}$ is further based on the utilization of the interconnect controller by the one or more additional software entities.

Example 16 comprises the method of example 1, wherein the non-processor unit circuitry comprises a memory controller and an interconnect controller, wherein the telemetry information comprises information indicating an integrated circuit component power consumption, physical processor unit active information, information indicating one or more operating frequencies of the non-processor unit circuitry, information indicating an operating frequency for individual of the physical processor units, information indicating a reference operating frequency of the integrated circuit component, information indicating an operating frequency of the memory controller, information indicating a utilization of a memory external to the integrated circuit component by the software entity, information indicating utilization of the interconnect controller by the software entity, information indicating an operating frequency of the interconnect controller, and utilization of the virtual processor unit by the software entity, wherein the software entity power consumption is determined according to the equation $P_{swe}=P_{ppu}(SF_{pu} \quad SF_{pu\_active} \quad SF_{pufreq}SF_{vpu\_ppu} \quad SF_{util\_vpu}+SF_{npu}SF_{npu\_freq}SF_{mem\_freq}SF_{mem\_util}SF_{IC\_freq}SF_{IC\_util})$, wherein $P_{swe}$ is the software entity power consumption, wherein $P_{ppu}$ is a per-processor unit power consumption based on the integrated circuit component power consumption and a number of physical processor units in the plurality of physical processor units, wherein $SF_{pu}$ is a processor unit power consumption scaling factor indicating a portion of integrated circuit component power consumed by the plurality of the physical processor units, wherein $SF_{pu\_active}$ is a physical processor unit active scaling factor indicating a portion of time that a physical processor unit on which the software entity is executing is in an active state and $SF_{pu\_active}$ is based on the physical processor unit active information, wherein $SF_{vpu\_ppu}$ is a virtual processor unit-to-physical processor unit scaling factor indicating a number of the physical processor units allocated to the virtual processor unit, wherein $SF_{util\_vpu}$ is a virtual processor unit utilization scaling factor indicating a utilization of a virtual processor unit on which the software entity is executing and $SF_{util\_vpu}$ is based on the utilization of the virtual processor unit by the software entity, wherein $SF_{pu\_freq}$ is a physical processor unit operating frequency scaling based on the reference operating frequency of the integrated circuit component and the operating frequency of the individual physical processor units, wherein $SF_{npu}$ is a non-processor unit circuitry power consumption scaling factor indicating a portion of integrated circuit component power consumed by non-processor unit circuitry, wherein $SF_{npu\_freq}$ is a non-processor unit circuitry operating frequency scaling factor based on the reference operating frequency of the integrated circuit component and the one or more operating frequencies of the non-processor unit circuitry, wherein $SF_{mem\_freq}$ is a memory controller operating frequency scaling factor based on the reference operating frequency of the integrated circuit component and the operating frequency of the memory controller, wherein $SF_{mem\_util}$ is a memory utilization scaling factor based on the memory utilization by the software entity, wherein $SF_{IC\_freq}$ is an interconnect controller operating frequency scaling factor based on the operating frequency of the interconnect controller, and wherein $SF_{IC\_util}$ is an interconnect controller utilization scaling factor based on the utilization of the interconnect controller by the software entity.

Example 17 comprises the method of any one of examples 1-16, wherein the integrated circuit component is a first integrated circuit component, the method further comprising: determining that the software entity power consumption fits within an available power budget of a second integrated circuit component; and causing the software entity to be moved from the first integrated circuit component to the second integrated circuit component.

Example 18 comprises the method of example 17, the causing the software entity to be moved from the first integrated circuit component to the second integrated circuit component being performed in response to determining that a power limit of the first integrated circuit component has been exceeded.

Example 19 comprises the method of example 17, the method further comprising causing the software entity to be moved from the first integrated circuit component to the second integrated circuit component in response to determining that moving the software entity from the first integrated circuit component would result in the first integrated circuit component not exceeding a power limit of the first integrated circuit component.

Example 20 comprises the method of any one of examples 1-16, wherein the telemetry information comprises information indicating an integrated circuit component power consumption, the method further comprising: determining that the integrated circuit component power consumption has exceeded a power limit of the integrated circuit component based on the integrated circuit component power consumption; selecting the software entity from among a plurality of software entities executing on the integrated circuit component for reduced power consumption based on the software entity power consumption; and causing an operating frequency of at least one of the one or more physical processor units allocated to the virtual processor unit to be reduced.

Example 21 comprises the method of any one of examples 1-20, wherein a user entity is associated with the software entity, the method further comprising sending the software entity power consumption and information identifying the software entity to a computing device or an electronic communication account associated with the user entity.

Example 22 comprises the method of any one of examples 1-21, wherein a user entity is associated with the software entity, the method further comprising: determining an amount to be billed to the user entity based on the software entity power consumption; and sending information indicating the amount to be billed to a computing device or an electronic communication account associated with the user entity.

Example 23 comprises the method of any one of examples 1-22, wherein the software entity is a first software entity and the software entity power consumption of the first software entity is a first software entity power consumption, the first software entity and one or more second software entities are associated with a user entity, individual of the second software entities having an associated second software entity power consumption, the method further comprising: summing the first software entity power consumption and the second software entity power consumptions to generate a total software entity power consumption; determining that the total software entity power consumption exceeds a power budget; and causing an action to be taken to reduce the first software entity power consumption.

Example 24 comprises the method of example 23, further comprising selecting the first software entity for power reduction based on a priority of the first software entity.

Example 25 comprises the method of example 24, wherein the action comprises terminating execution of the first software entity.

Example 26 comprises the method of example 24, wherein the action comprises reducing an operating frequency of one or more of the physical processor units allocated to the virtual processor unit.

Example 27 comprises the method of example 24, wherein the integrated circuit component is a first integrated circuit component and the action comprises moving the first software entity from the first integrated circuit component to a second integrated circuit component.

Example 28 comprises the method of example 27, wherein the first integrated circuit component is located in a first computing device and the second integrated circuit component is located in a second computing device.

Example 29 comprises the method of example 24, wherein the action comprises moving the first software entity from one of the physical processor units allocated to the virtual processor unit to another physical processor unit of the integrated circuit component.

Example 30 comprises the method of any one of examples 1-29, wherein the software entity is a first software entity and the software entity power consumption of the first software entity is a first software entity power consumption, the first software entity and one or more second software entities are associated with a user entity, individual of the second software entities having an associated second software entity power consumption, the method further comprising: summing the first software entity power consumption and the second software entity power consumptions to generate a total software entity power consumption; determining that the total software entity power consumption for the user entity is below a power budget; and causing an action to be taken to increase power consumption of the first software entity.

Example 31 comprises the method of example 30, wherein the action comprises initiating execution of one or more additional instances of the first software entity.

Example 32 comprises the method of example 30, wherein the action comprises increasing an operating frequency of one of the physical processor units allocated to the virtual processor unit.

Example 33 comprises the method of any one of examples 1-32, wherein the software entity is a virtual machine.

Example 34 comprises the method of any one of examples 1-32, wherein the software entity is a container.

Example 35 is one or more computer-readable storage media having instructions stored thereon that, when executed by one or more processor units cause the one or more processor units to perform any one of the methods of examples 1-34.

Example 36 is a computing system comprising: one or more first physical processor units; and one or more computer-readable media storing instructions thereon that, when executed, cause the one or more first physical processor units to: receive telemetry information associated with a computing platform on which a software entity is executing, the computing platform comprising an integrated circuit component comprising a plurality of second physical processor units and non-processor unit circuitry, the software entity executing on a virtual processor unit to which one or more of the second physical processor units are allocated; and determine a software entity power consumption for the software entity based on the telemetry information.

Example 37 comprises the computing system of example 36, wherein the telemetry information comprises information indicating an integrated circuit component power consumption and to determine the software entity power consumption comprises: to determine a per-processor unit power consumption based on the integrated circuit component power consumption and a number of second physical processor units in the plurality of second physical processor units; and to determine the software entity power consumption by scaling the per-processor unit power consumption by a sum of a processor unit power consumption scaling factor indicating a portion of integrated circuit component power consumed by the plurality of the second physical processor units and a non-processor unit circuitry power consumption scaling factor indicating a portion of integrated circuit component power consumed by the non-processor unit circuitry.

Example 38 comprises the computing system of example 37, wherein the telemetry information further comprises one or more of the following: second physical processor unit active information, information indicating an operating frequency for individual of the second physical processor units, information indicating a reference operating frequency of the integrated circuit component, and utilization of the virtual processor unit by the software entity, and wherein to determine the software entity power consumption further comprises scaling the processor unit power consumption scaling factor by one or more of the following: a second physical processor unit active scaling factor indicating a portion of time that a second physical processor unit on which the software entity is executing is in an active state that is based on the second physical processor unit active information, a second physical processor unit operating frequency scaling based on the reference operating frequency of the integrated circuit component and the operating frequency of the individual second physical processor units, a virtual processor unit-to-physical processor unit scaling factor indicating a number of the second physical processor units allocated to the virtual processor unit, and a virtual processor unit utilization scaling factor indicating a utilization of a virtual processor unit on which the software entity is executing that is based on the utilization of the virtual processor unit by the software entity.

Example 39 comprises the computing system of example 37, wherein the non-processor unit circuitry comprises a memory controller and an interconnect controller, wherein the telemetry information further comprises one or more of the following: information indicating one or more operating frequencies of the non-processor unit circuitry, information indicating a reference operating frequency of the integrated circuit component, information indicating an operating frequency of the memory controller, information indicating a utilization of a memory external to the integrated circuit component by the software entity, information indicating an operating frequency of the interconnect controller, information indicating utilization of the interconnect controller by the software entity, and utilization of the virtual processor unit by the software entity, and wherein to determine the software entity power consumption further comprises scaling the non-processor unit circuitry power consumption scaling factor by one or more of the following: a non-processor unit circuitry operating frequency scaling factor based on the reference operating frequency of the integrated circuit component and the one or more operating frequencies of the non-processor unit circuitry, a memory controller operating frequency scaling factor based on the reference operating frequency of the integrated circuit component and the operating frequency of the memory controller, a memory utilization scaling factor based on the memory utilization by the software entity, an interconnect controller operating frequency scaling factor based on the operating frequency of the interconnect controller, an interconnect controller utilization scaling factor based on the utilization of the interconnect controller by the software entity.

Example 40 comprises the computing system of example 36, wherein the telemetry information comprises information indicating an integrated circuit component power consumption, second physical processor unit active information, and information indicating a utilization of the virtual processor unit by the software entity, wherein the software entity power consumption is determined according to the equation: $P_{swe}=P_{ppu}(SF_{pu} \ SF_{pu\_active} \ SF_{vpu\_ppu} \ SF_{util\_vpu}+ SF_{npu})$, wherein $P_{swe}$ is the software entity power consumption, wherein $P_{ppu}$ is a per-processor unit power consumption based on the integrated circuit component power consumption and a number of second physical processor units in the plurality of second physical processor units, wherein $SF_{pu}$ is a processor unit power consumption scaling factor indicating a portion of integrated circuit component power consumed by the plurality of the second physical processor units, wherein $SF_{pu\_active}$ is a second physical processor unit active scaling factor indicating a portion of time that a second physical processor unit on which the software entity is executing is in an active state and $SF_{pu\_active}$ is based on the second physical processor unit active information, wherein $SF_{vpu\_ppu}$ is a virtual processor unit-to-second physical processor unit scaling factor indicating a number of the second physical processor units allocated to the virtual processor unit, wherein $SF_{util\_vpu}$ is a virtual processor unit utilization scaling factor indicating a utilization of the virtual processor unit by the software entity and $SF_{util\_vpu}$ is based on the utilization of the virtual processor unit by the software entity, and wherein $SF_{npu}$ is a non-processor unit circuitry power consumption scaling factor indicating a portion of integrated circuit component power consumed by the non-processor unit circuitry.

Example 41 comprises the computing system of example 40, wherein the information indicating utilization of the virtual processor unit by the software entity comprises information indicating DPDK busyness.

Example 42 comprises the computing system of example 36, wherein the telemetry information comprises information indicating integrated circuit component power consumption, second physical processor unit active information, second physical processor unit idle information, and information indicating a utilization of the virtual processor unit by the software entity, wherein the software entity power consumption is determined according to the equation $P_{swe}=P_{ppu}(SF_{pu}\ SF_{pu\_active}\ SF_{vpu\_ppu}\ SF_{util\_vpu}+SF_{npu})$, wherein $P_{swe}$ is the software entity power consumption, wherein $P_{ppu}$ is a per-processor unit power consumption based on the integrated circuit component power consumption and a number of second physical processor units in the plurality of second physical processor units, wherein $SF_{pu}$ is a processor unit power consumption scaling factor indicating a portion of integrated circuit component power consumed by the plurality of the second physical processor units, wherein $SF_{pu\_active}$ is a second physical processor unit active scaling factor indicating a portion of time that a second physical processor unit on which the software entity is executing is in an active state or in an idle state that is shallower than a threshold idle state, and $SF_{pu\_active}$ is based on the second physical processor unit active information and the second physical processor unit idle information, wherein $SF_{vpu\_ppu}$ is a virtual processor unit-to-second physical processor unit scaling factor indicating a number of the second physical processor units allocated to the virtual processor unit, wherein $SF_{util\_vpu}$ is a virtual processor unit utilization scaling factor indicating a utilization of a virtual processor unit on which the software entity is executing and $SF_{util\_vpn}$ is based on the utilization of the virtual processor unit by the software entity, and wherein $SF_{npu}$ is a non-processor unit circuitry power consumption scaling factor indicating a portion of integrated circuit component power consumed by non-processor unit circuitry.

Example 43 comprises the computing system of example 36, wherein the telemetry information comprises information indicating an integrated circuit component power consumption, second physical processor unit active information, information indicating a reference operating frequency of the integrated circuit component, information indicating an operating frequency of individual of the second physical processor units allocated to the virtual processor unit, and information indicating a utilization of the virtual processor unit by the software entity, wherein the software entity power consumption is determined according to the equation $P_{swe}=P_{ppu}(SF_{pu}\ SF_{pu\_active}\ SF_{vpu\_ppu}\ SF_{util\_vpu}SF_{pu\_freq}+SF_{npu})$, wherein $P_{swe}$ is the software entity power consumption, wherein $P_{ppu}$ is a per-processor unit power consumption based on the integrated circuit component power consumption and a number of second physical processor units in the plurality of second physical processor units, wherein $SF_{pu}$ is a processor unit power consumption scaling factor indicating a portion of integrated circuit component power consumed by the plurality of the second physical processor units, wherein $SF_{pu\_active}$ is a processor unit active scaling factor indicating a portion of time that a second physical processor unit on which the software entity is executing is in an active state or an idle that is a shallower idle than a threshold idle state, and $SF_{pu\_active}$ is based on the second physical processor unit active information, wherein $SF_{vpu\_ppu}$ is a virtual processor unit-to-second physical processor unit scaling factor indicating a number of the second physical processor units allocated to the virtual processor unit, wherein $SF_{util\_vpu}$ is a virtual processor unit utilization scaling factor indicating a utilization of a virtual processor unit on which the software entity is executing and $SF_{util\_vpu}$ is based on the utilization of the virtual processor unit by the software entity, wherein $SF_{pu\_freq}$ is a processor unit operating frequency scaling based on the reference operating frequency of the integrated circuit component and the operating frequency of the individual one or more second physical processor units allocated to the virtual processor unit, and wherein $SF_{npu}$ is a non-processor unit circuitry power consumption scaling factor indicating a portion of integrated circuit component power consumed by non-processor unit circuitry.

Example 44 comprises the computing system of example 36, wherein the telemetry information comprises information indicating an integrated circuit component power consumption, second physical processor unit active information, information indicating a reference operating frequency of the integrated circuit component, information indicating one or more operating frequencies of the non-processor unit circuitry, and information indicating a utilization of the virtual processor unit by the software entity, wherein the software entity power consumption is determined according to the equation $P_{swe}=P_{ppu}(SF_{pu}\ SF_{pu\_active}SF_{vpu\_ppu}\ SF_{util\_vpu}+SF_{npu}\ SF_{npu\_freq})$ wherein $P_{swe}$ is the software entity power consumption, wherein $P_{ppu}$ is a per-processor unit power consumption based on the integrated circuit component power consumption and a number of second physical processor units in the plurality of second physical processor units, wherein $SF_{pu}$ is a processor unit power consumption scaling factor indicating a portion of integrated circuit component power consumed by the plurality of the second physical processor units, wherein $SF_{pu\_active}$ is a second physical processor unit active scaling factor indicating a portion of time that a second physical processor unit on which the software entity is executing is in an active state and $SF_{pu\_active}$ is based on the second physical processor unit active information, wherein $SF_{vpu\_ppu}$ is a virtual processor unit-to-second physical processor unit scaling factor indicating a number of the second physical processor units allocated to the virtual processor unit, wherein $SF_{util\_vpu}$ is a virtual processor unit utilization scaling factor indicating a utilization of a virtual processor unit on which the software entity is executing and $SF_{util\_vpn}$ is based on the information indicating the utilization of the virtual processor unit by the software entity, wherein $SF_{npu}$ is a non-processor unit circuitry power consumption scaling factor indicating a portion of integrated circuit component power consumed by non-processor unit circuitry, and wherein $SF_{npu\_freq}$ is a non-processor unit circuitry operating frequency scaling factor based on the information indicating a reference operating frequency of the integrated circuit component and the information indicating the one or more operating frequencies of the non-processor unit circuitry.

Example 45 comprises the computing system of example 36, wherein the non-processor unit circuitry comprises a memory controller, wherein the telemetry information comprises information indicating an integrated circuit component power consumption, second physical processor unit active information, information indicating a reference operating frequency of the integrated circuit component, information indicating an operating frequency of the memory controller, and information indicating a utilization of the virtual processor unit by the software entity, wherein the software entity power consumption is determined according to the equation $P_{swe}=P_{ppu}(SF_{pu}\ SF_{pu\_active}SF_{vpu\_ppu}\ SF_{util\_vpu}+SF_{npu}\ SF_{mem\_freq})$, wherein $P_{swe}$ is the software entity power consumption, wherein $P_{ppu}$ is a per-processor unit power consumption based on the integrated circuit component power consumption and a number of second physical processor units in the plurality of second physical processor units, wherein $SF_{pu}$ is a processor unit power consumption scaling factor indicating a portion of integrated circuit component power consumed by the plurality of the second physical processor units, wherein $SF_{pu\_active}$ is a second physical processor unit active scaling factor indicating a portion of time that a second physical processor unit on which the software entity is executing is in an active state and $SF_{pu\_active}$ is based on the second physical processor unit active information, wherein $SF_{vpu\_ppu}$ is a virtual processor unit-to-second physical processor unit scaling factor indicating a number of the second physical processor units allocated to the virtual processor unit, wherein $SF_{util\_vpu}$ is a virtual processor unit utilization scaling factor indicating a utilization of a virtual processor unit on which the software entity is executing and $SF_{util\_vpu}$ is based on the utilization of the virtual processor unit by the software entity, wherein $SF_{npu}$ is a non-processor unit circuitry power consumption scaling factor indicating a portion of integrated circuit component power consumed by non-processor unit circuitry, and wherein $SF_{mem\_freq}$ is a memory controller operating frequency scaling factor based on the reference operating frequency of the integrated circuit component and the operating frequency of the memory controller.

Example 46 comprises the computing system of example 36, wherein the telemetry information comprises information indicating an integrated circuit component power consumption, second physical processor unit active information, information indicating utilization of a memory external to the integrated circuit component by the software entity, and information indicating a utilization of the virtual processor unit by the software entity, wherein the software entity power consumption is determined according to the equation $P_{swe}=P_{ppu}(SF_{pu}$  $SF_{pu\_active}SF_{vpu\_ppu}$  $SF_{util\_vpu}+$ $SF_{npu}$ $SF_{mem\_util})$, wherein $P_{swe}$ is the software entity power consumption, wherein $P_{ppu}$ is a per-processor unit power consumption based on the integrated circuit component power consumption and a number of second physical processor units in the plurality of second physical processor units, wherein $SF_{pu}$ is a processor unit power consumption scaling factor indicating a portion of integrated circuit component power consumed by the plurality of the second physical processor units, wherein $SF_{pu\_active}$ is a second physical processor unit active scaling factor indicating a portion of time that a second physical processor unit on which the software entity is executing is in an active state and $SF_{pu\_active}$ is based on the second physical processor unit active information, wherein $SF_{vpu\_ppu}$ is a virtual processor unit-to-second physical processor unit scaling factor indicating a number of the second physical processor units allocated to the virtual processor unit, wherein $SF_{util\_vpu}$ is a virtual processor unit utilization scaling factor indicating a utilization of a virtual processor unit on which the software entity is executing and $SF_{util\_vpu}$ is based on the utilization of the virtual processor unit by the software entity, wherein $SF_{npu}$ is a non-processor unit circuitry power consumption scaling factor indicating a portion of integrated circuit component power consumed by non-processor unit circuitry, and wherein $SF_{mem\_util}$ is a memory utilization scaling factor based on the utilization of the memory by the software entity.

Example 47 comprises the computing system of example 46, wherein the telemetry information further comprises information indicating utilization of the memory by one or more additional software entities executing on the integrated circuit component and $SF_{mem\_util}$ is further based on the utilization of the memory by the one or more additional software entities.

Example 48 comprises the computing system of example 36, wherein the non-processor unit circuitry comprises an interconnect controller, wherein the telemetry information comprises information indicating an integrated circuit component power consumption, second physical processor unit active information, information indicating a reference operating frequency of the integrated circuit component, information indicating an operating frequency of the interconnect controller, and information indicating a utilization of the virtual processor unit by the software entity, wherein the software entity power consumption is determined according to the equation $P_{swe}=P_{ppu}(SF_{pu}$  $SF_{pu\_active}SF_{vpu\_ppu}$  $SF_{util\_vpn}+SF_{npu}S-F_{IC\_freq})$, wherein $P_{swe}$ is the software entity power consumption, wherein $P_{ppu}$ is a per-processor unit power consumption based on the integrated circuit component power consumption and a number of second physical processor units in the plurality of second physical processor units, wherein $SF_{pu}$ is a processor unit power consumption scaling factor indicating a portion of integrated circuit component power consumed by the plurality of the physical processor units, wherein $SF_{pu\_active}$ is a second physical processor unit active scaling factor indicating a portion of time that a second physical processor unit on which the software entity is executing is in an active state and $SF_{pu\_active}$ is based on the second physical processor unit active information, wherein $SF_{vpu\_ppu}$ is a virtual processor unit-to-second physical processor unit scaling factor indicating a number of the second physical processor units allocated to the virtual processor unit, wherein $SF_{util\_vpu}$ is a virtual processor unit utilization scaling factor indicating a utilization of a virtual processor unit on which the software entity is executing and $SF_{util\_vpn}$ is based on the information indicating the utilization of the virtual processor unit by the software entity, wherein $SF_{npu}$ is a non-processor unit circuitry power consumption scaling factor indicating a portion of integrated circuit component power consumed by non-processor unit circuitry, and wherein $SF_{IC\_freq}$ is an interconnect controller operating frequency scaling factor based on the operating frequency of the interconnect controller.

Example 49 comprises the computing system of example 36, wherein the non-processor unit circuitry comprises an interconnect controller, wherein the telemetry information comprises information indicating an integrated circuit component power consumption, second physical processor unit active information, information indicating a reference operating frequency of the integrated circuit component, information indicating utilization of the interconnect controller by the software entity, and utilization of the virtual processor unit by the software entity, wherein the software entity power consumption is determined according to the equation $P_{swe}=P_{ppu}(SF_{pu}$  $SF_{pu\_active}SF_{vpu\_ppu}$  $SF_{util\_vpu}+SF_{npu}$ $SF_{IC\_util})$, wherein $P_{swe}$ is the software entity power consumption, wherein $P_{ppu}$ is a per-processor unit power consumption based on the integrated circuit component power consumption and a number of second physical processor units in the plurality of second physical processor units, wherein $SF_{pu}$ is a second physical processor unit power consumption scaling factor indicating a portion of integrated circuit component power consumed by the plurality of the second physical processor units, wherein $SF_{pu\_active}$ is a second physical processor unit active scaling factor indicating a portion of time that a second physical processor unit on which the software entity is executing is in an active state and $SF_{pu\_active}$ is based on the second physical processor unit active information, wherein $SF_{vpu\_ppu}$ is a virtual processor unit-to-second physical processor unit scaling factor indicating a number of the second physical processor units allocated to the virtual processor unit, wherein $SF_{util\_vpu}$ is a virtual processor unit utilization scaling factor indicating a utilization of a virtual processor unit on which the software entity is executing and $SF_{util\_vpu}$ is based on the information indicating utilization of the virtual processor unit by the software entity, wherein $SF_{npu}$ is a non-processor unit circuitry power consumption scaling factor indicating a portion of integrated circuit component power consumed by non-processor unit circuitry, and wherein $SF_{IC\_util}$ is an interconnect controller utilization scaling factor based on the information indicating utilization of the interconnect controller by the software entity.

Example 50 comprises the computing system of example 49, wherein the telemetry information further comprises information indicating utilization of the interconnect controller by one or more additional software entities executing on the integrated circuit component and $SF_{IC\_util}$ is further based on the utilization of the interconnect controller by the one or more additional software entities.

Example 51 comprises the computing system of example 36, wherein the non-processor unit circuitry comprises a memory controller and an interconnect controller, wherein the telemetry information comprises information indicating an integrated circuit component power consumption, second physical processor unit active information, information indicating one or more operating frequencies of the non-processor unit circuitry, information indicating an operating frequency for individual of the second physical processor units, information indicating a reference operating frequency of the integrated circuit component, information indicating an operating frequency of the memory controller, information indicating a utilization of a memory external to the integrated circuit component by the software entity, information indicating utilization of the interconnect controller by the software entity, information indicating an operating frequency of the interconnect controller, and utilization of the virtual processor unit by the software entity, wherein the software entity power consumption is determined according to the equation
$$P_{swe}=P_{ppu}(SF_{pu} \quad SF_{pu\_active} \quad SF_{pufreq}SF_{vpu\_ppu} \quad SF_{util\_vpu}+ SF_{npu}SF_{npu\_freq}SF_{mem\_freq}SF_{mem\_util}SF_{IC\_freq}SF_{IC\_util}),$$
wherein $P_{swe}$ is the software entity power consumption, wherein $P_{ppu}$ is a per-processor unit power consumption based on the integrated circuit component power consumption and a number of second physical processor units in the plurality of second physical processor units, wherein $SF_{pu}$ is a processor unit power consumption scaling factor indicating a portion of integrated circuit component power consumed by the plurality of the second physical processor units, wherein $SF_{pu\_active}$ is a second physical processor unit active scaling factor indicating a portion of time that a second physical processor unit on which the software entity is executing is in an active state and $SF_{pu\_active}$ is based on the second physical processor unit active information, wherein $SF_{vpu\_ppu}$ is a virtual processor unit-to-second physical processor unit scaling factor indicating a number of the second physical processor units allocated to the virtual processor unit, wherein $SF_{util\_vpu}$ is a virtual processor unit utilization scaling factor indicating a utilization of a virtual processor unit on which the software entity is executing and $SF_{util\_vpu}$ is based on the utilization of the virtual processor unit by the software entity, wherein $SF_{pu\_freq}$ is a second physical processor unit operating frequency scaling based on the reference operating frequency of the integrated circuit component and the operating frequency of the individual second physical processor units, wherein $SF_{npu}$ is a non-processor unit circuitry power consumption scaling factor indicating a portion of integrated circuit component power consumed by non-processor unit circuitry, wherein $SF_{npu\_freq}$ is a non-processor unit circuitry operating frequency scaling factor based on the reference operating frequency of the integrated circuit component and the one or more operating frequencies of the non-processor unit circuitry, wherein $SF_{mem\_freq}$ is a memory controller operating frequency scaling factor based on the reference operating frequency of the integrated circuit component and the operating frequency of the memory controller, wherein $SF_{mem\_util}$ is a memory utilization scaling factor based on the memory utilization by the software entity, wherein $SF_{IC\_freq}$ is an interconnect controller operating frequency scaling factor based on the operating frequency of the interconnect controller, and wherein $SF_{IC\_util}$ is an interconnect controller utilization scaling factor based on the utilization of the interconnect controller by the software entity.

Example 52 comprises the computing system of any one of examples 36-51, wherein the integrated circuit component is a first integrated circuit component, the instructions stored on the one or more computer-readable media further cause the one or more first physical processor units to: determine that the software entity power consumption fits within an available power budget of a second integrated circuit component; and cause the software entity to be moved from the first integrated circuit component to the second integrated circuit component.

Example 53 comprises the computing system of example 52, wherein the instructions stored on the one or more computer-readable media further cause the one or more first physical processor units to determine that a power limit of the first integrated circuit component has been exceeded, the causing the software entity to be moved from the first integrated circuit component to the second integrated circuit component being performed in response to determining that the power limit of the first integrated circuit component has been exceeded.

Example 54 comprises the computing system of any one of examples 36-51, wherein the telemetry information comprises information indicating an integrated circuit component power consumption, the instructions stored on the one or more computer-readable media further cause the one or more first physical processor units to: determine that the integrated circuit component power consumption exceeds a power limit of the integrated circuit component based on the integrated circuit component power consumption; select the software entity from among a plurality of software entities executing on the integrated circuit component for reduced power consumption based on the software entity power consumption; and cause an operating frequency of at least one of the second physical processor units allocated to the virtual processor unit to be reduced.

Example 55 comprises the computing system of any one of examples 36-54, wherein a user entity is associated with the software entity, the instructions stored on the one or more computer-readable media further cause the one or more first physical processor units to send the software entity power consumption and information identifying the software entity to a computing device or an electronic communication account associated with the user entity.

Example 56 comprises the computing system of any one of examples 36-55, wherein a user entity is associated with the software entity, the instructions stored on the one or more computer-readable media further cause the one or more first physical processor units to: determine an amount to be billed to the user entity based on the software entity power consumption; and send information indicating the amount to be billed to a computing device or an electronic communication account associated with the user entity.

Example 57 comprises the computing system of any one of examples 36-56, wherein the software entity is a first software entity and the software entity power consumption of the first software entity is a first software entity power consumption, the first software entity and one or more second software entities are associated with a user entity, individual of the second software entities having an associated second software entity power consumption, the instructions stored on the one or more computer-readable media further cause the one or more first physical processor units to: sum the first software entity power consumption and the second software entity power consumptions to generate a total software entity power consumption; determine that the total software entity power consumption exceeds a power budget; and cause an action to be taken to reduce the first software entity power consumption.

Example 58 comprises the computing system of example 57, the instructions stored on the one or more computer-readable media further cause the one or more first physical processor units to select the first software entity for power reduction based on a priority of the first software entity.

Example 59 comprises the computing system of example 57, wherein the action comprises to terminate execution of the first software entity.

Example 60 comprises the computing system of example 57, wherein the action comprises to reduce an operating frequency of one or more of the second physical processor units allocated to the virtual processor unit.

Example 61 comprises the computing system of example 57, wherein the integrated circuit component is a first integrated circuit component and the action comprises to move the first software entity from the first integrated circuit component to a second integrated circuit component.

Example 62 comprises the computing system of example 57, wherein the action comprises to move the first software entity from one of the second physical processor units allocated to the virtual processor unit to another second physical processor unit of the integrated circuit component.

Example 63 comprises the computing system of example 57, wherein the software entity is a first software entity and the software entity power consumption of the first software entity is a first software entity power consumption, the first software entity and one or more second software entities are associated with a user entity, individual of the second software entities having an associated second software entity power consumption, the instructions stored on the one or more computer-readable media further cause the one or more first physical processor units to: sum the first software entity power consumption and the second software entity power consumptions to generate a total software entity power consumption; determine that the total software entity power consumption for the user entity is below a power budget; and cause an action to be taken to increase power consumption of the first software entity.

Example 64 comprises the computing system of example 63, wherein the action comprises to initiate execution of one or more additional instances of the first software entity.

Example 65 comprises the computing system of example 63, wherein the action comprises to increase an operating frequency of one of the second physical processor units allocated to the virtual processor unit.

Example 66 comprises the computing system of any one of examples 36-65, wherein the software entity is a virtual machine.

Example 67 comprises the computing system of any one of examples 36-65, wherein the software entity is a container.

Example 68 comprises the computing system of any one of examples 36-65, wherein the first physical processor units are located in a first computing system and the second physical processor units are located in a second computing system.

Example 69 comprises the computing system of any one of examples 36-65, wherein the first physical processor units and the second physical processor units are located in the same computing system.

The invention claimed is:

1. A method comprising:

receiving, at a first computing device, telemetry information associated with a computing platform of a second computing device on which a software entity is executing, wherein the computing platform comprises an integrated circuit component comprising a plurality of physical processor units and non-processor unit circuitry, the software entity executing on a virtual processor unit to which one or more of the plurality of physical processor units are allocated, and the telemetry information comprises information indicating an integrated circuit component power consumption;

determining, at the first computing device, a software entity power consumption for the software entity based on the telemetry information, wherein determining the software entity power consumption comprises:

determining a per-processor unit power consumption based on the integrated circuit component power consumption and a number of physical processor units in the plurality of physical processor units; and determining the software entity power consumption by scaling the per-processor unit power consumption by a sum of:

a processor unit power consumption scaling factor or a product of a plurality of processor unit power consumption scaling factors indicating a portion of integrated circuit component power consumed by the plurality of physical processor units; and a non-processor unit circuitry power consumption scaling factor or a product of a plurality of non-processor unit circuitry power consumption scaling factors indicating a portion of integrated circuit component power consumed by the non-processor unit circuitry; and causing, by the first computing device, an action to be taken at the second computing device to reduce power consumption of the software entity.

2. The method of claim 1, wherein the telemetry information further comprises one or more of: physical processor unit active information, information indicating an operating frequency for individual of the plurality of physical processor units, information indicating a reference operating frequency of the integrated circuit component, and utilization of the virtual processor unit by the software entity, and wherein the product of the plurality of processor unit power consumption scaling factors comprises a product of one or more of: a physical processor unit active scaling factor indicating a portion of time that a physical processor unit on which the software entity is executing is in an active state that is based on the physical processor unit active information, a physical processor unit operating frequency scaling based on the reference operating frequency of the integrated circuit component and the operating frequency of individual of the plurality of physical processor units, a virtual processor unit-to-physical processor unit scaling factor indicating a number of the plurality of physical processor units allocated to the virtual processor unit, and a virtual processor unit utilization scaling factor indicating a utilization of a virtual processor unit on which the software entity is executing that is based on the utilization of the virtual processor unit by the software entity.

3. The method of claim 1,
wherein the non-processor unit circuitry comprises a memory controller and an interconnect controller,
wherein the telemetry information further comprises one or more of: information indicating one or more operating frequencies of the non-processor unit circuitry, information indicating a reference operating frequency of the integrated circuit component, information indicating an operating frequency of the memory controller, information indicating a utilization of a memory external to the integrated circuit component by the software entity, information indicating an operating frequency of the interconnect controller, information indicating utilization of the interconnect controller by the software entity, and utilization of the virtual processor unit by the software entity, and
wherein the product of the plurality of non-processor unit circuitry power consumption scaling factors comprises a product of one or more of: a non-processor unit circuitry operating frequency scaling factor based on the reference operating frequency of the integrated circuit component and the one or more operating frequencies of the non-processor unit circuitry, a memory controller operating frequency scaling factor based on the reference operating frequency of the integrated circuit component and the operating frequency of the memory controller, a memory utilization scaling factor based on the utilization of the memory external to the integrated circuit component by the software entity, an interconnect controller operating frequency scaling factor based on the operating frequency of the interconnect controller, an interconnect controller utilization scaling factor based on the utilization of the interconnect controller by the software entity.

4. The method of claim 1, wherein the telemetry information further comprises physical processor unit active information and information indicating a utilization of the virtual processor unit by the software entity,
wherein the software entity power consumption is determined according to:

$$P_{swe} = P_{ppu}(SF_{pu}SF_{pu\_active}SF_{vpu\_ppu}SF_{util\_vpu} + SF_{npu})$$

wherein $P_{swe}$ is the software entity power consumption,
wherein $P_{ppu}$ is a per-processor unit power consumption based on the integrated circuit component power consumption and a number of physical processor units in the plurality of physical processor units,
wherein $SF_{pu}$ is a processor unit power consumption scaling factor indicating a portion of integrated circuit component power consumed by the plurality of physical processor units,
wherein $SF_{pu\_active}$ is a physical processor unit active scaling factor indicating a portion of time that a physical processor unit on which the software entity is executing is in an active state and $SF_{pu\_active}$ is based on the physical processor unit active information,
wherein $SF_{vpu\_ppu}$ is a virtual processor unit-to-physical processor unit scaling factor indicating a number of the plurality of physical processor units allocated to the virtual processor unit, wherein $SF_{util\_vpu}$ is a virtual processor unit utilization scaling factor indicating a utilization of the virtual processor unit by the software entity and $SF_{util\_vpu}$ is based on the utilization of the virtual processor unit by the software entity, and
wherein $SF_{npu}$ is a non-processor unit circuitry power consumption scaling factor indicating a portion of integrated circuit component power consumed by the non-processor unit circuitry.

5. The method of claim 1,
wherein the telemetry information further comprises physical processor unit active information, information indicating a reference operating frequency of the integrated circuit component, information indicating an operating frequency of individual of the plurality of physical processor units allocated to the virtual processor unit, and information indicating a utilization of the virtual processor unit by the software entity,
wherein the software entity power consumption is determined according to:

$$P_{swe} = P_{ppu}(SF_{pu}SF_{pu\_active}SF_{vpu\_ppu}SF_{util\_vpu}SF_{pu\_freq} + SF_{npu})$$

wherein $P_{swe}$ is the software entity power consumption,
wherein $P_{ppu}$ is a per-processor unit power consumption based on the integrated circuit component power consumption and a number of physical processor units in the plurality of physical processor units,
wherein $SF_{pu}$ is a processor unit power consumption scaling factor indicating a portion of integrated circuit component power consumed by the plurality of physical processor units,
wherein $SF_{pu\_active}$ is a processor unit active scaling factor indicating a portion of time that a physical processor unit on which the software entity is executing is in an active state or an idle that is a shallower idle than a threshold idle state, and $SF_{pu\_active}$ is based on the physical processor unit active information,
wherein $SF_{vpu\_ppu}$ is a virtual processor unit-to-physical processor unit scaling factor indicating a number of the plurality of physical processor units allocated to the virtual processor unit,
wherein $SF_{util\_vpu}$ is a virtual processor unit utilization scaling factor indicating a utilization of a virtual processor unit on which the software entity is executing and $SF_{util\_vpu}$ is based on the utilization of the virtual processor unit by the software entity,
wherein $SF_{pu\_freq}$ is a processor unit operating frequency scaling based on the reference operating frequency of the integrated circuit component and the operating frequency of the individual of the plurality of physical processor units allocated to the virtual processor unit, and
wherein $SF_{npu}$ is a non-processor unit circuitry power consumption scaling factor indicating a portion of integrated circuit component power consumed by non-processor unit circuitry.

6. The method of claim 1, wherein the telemetry information further comprises physical processor unit active information, information indicating a reference operating frequency of the integrated circuit component, information indicating one or more operating frequencies of the non-processor unit circuitry, and information indicating a utilization of the virtual processor unit by the software entity,
wherein the software entity power consumption is determined according to:

$$P_{swe}=P_{ppu}(SF_{pu}SF_{pu\_active}SF_{vpu\_ppu}SF_{util\_vpu}+$$
$$SF_{npu}SF_{npu\_freq})$$

wherein $P_{swe}$ is the software entity power consumption, wherein $P_{ppu}$ is a per-processor unit power consumption based on the integrated circuit component power consumption and a number of physical processor units in the plurality of physical processor units, wherein $SF_{pu}$ is a processor unit power consumption scaling factor indicating a portion of integrated circuit component power consumed by the plurality of physical processor units, wherein $SF_{pu\_active}$ is a physical processor unit active scaling factor indicating a portion of time that a physical processor unit on which the software entity is executing is in an active state and $SF_{pu\_active}$ is based on the physical processor unit active information, wherein $SF_{vpu\_ppu}$ is a virtual processor unit-to-physical processor unit scaling factor indicating a number of the plurality of physical processor units allocated to the virtual processor unit, wherein $SF_{util\_vpu}$ is a virtual processor unit utilization scaling factor indicating a utilization of a virtual processor unit on which the software entity is executing and $SF_{util\_vpu}$ is based on the information indicating utilization of the virtual processor unit by the software entity, wherein $SF_{npu}$ is a non-processor unit circuitry power consumption scaling factor indicating a portion of integrated circuit component power consumed by non-processor unit circuitry, and wherein $SF_{npu\_freq}$ is a non-processor unit circuitry operating frequency scaling factor based on the information indicating a reference operating frequency of the integrated circuit component and the information indicating the one or more operating frequencies of the non-processor unit circuitry.

7. The method of claim 1, wherein the non-processor unit circuitry comprises a memory controller and an interconnect controller, wherein the telemetry information further comprises physical processor unit active information, information indicating one or more operating frequencies of the non-processor unit circuitry, information indicating an operating frequency for individual of the plurality of physical processor units, information indicating a reference operating frequency of the integrated circuit component, information indicating an operating frequency of the memory controller, information indicating a utilization of a memory external to the integrated circuit component by the software entity, information indicating utilization of the interconnect controller by the software entity, information indicating an operating frequency of the interconnect controller, and utilization of the virtual processor unit by the software entity, wherein the software entity power consumption is determined according to:

$$P_{swe}=P_{ppu}(SF_{pu}SF_{pu\_active}SF_{pu\_freq}SF_{vpu\_ppu}$$
$$SF_{util\_vpu}+SF_{npu}SF_{npu\_freq}SF_{mem\_freq}SF_{mem\_util}S-$$
$$F_{IC\_freq}SF_{IC\_util})$$

wherein $P_{swe}$ is the software entity power consumption, wherein $P_{ppu}$ is a per-processor unit power consumption based on the integrated circuit component power consumption and a number of physical processor units in the plurality of physical processor units, wherein $SF_{pu}$ is a processor unit power consumption scaling factor indicating a portion of integrated circuit component power consumed by the plurality of physical processor units, wherein $SF_{pu\_active}$ is a physical processor unit active scaling factor indicating a portion of time that a physical processor unit on which the software entity is executing is in an active state and $SF_{pu\_active}$ is based on the physical processor unit active information, wherein $SF_{vpu\_ppu}$ is a virtual processor unit-to-physical processor unit scaling factor indicating a number of the plurality of physical processor units allocated to the virtual processor unit, wherein $SF_{util\_vpu}$ is a virtual processor unit utilization scaling factor indicating a utilization of a virtual processor unit on which the software entity is executing and $SF_{util\_vpu}$ is based on the utilization of the virtual processor unit by the software entity, wherein $SF_{pu\_freq}$ is a physical processor unit operating frequency scaling based on the reference operating frequency of the integrated circuit component and the operating frequency of the individual of the plurality of physical processor units, wherein $SF_{npu}$ is a non-processor unit circuitry power consumption scaling factor indicating a portion of integrated circuit component power consumed by non-processor unit circuitry, wherein $SF_{npu\_freq}$ is a non-processor unit circuitry operating frequency scaling factor based on the reference operating frequency of the integrated circuit component and the one or more operating frequencies of the non-processor unit circuitry, wherein $SF_{mem\_freq}$ is a memory controller operating frequency scaling factor based on the reference operating frequency of the integrated circuit component and the operating frequency of the memory controller, wherein $SF_{mem\_util}$ is a memory utilization scaling factor based on the utilization of the memory external to the integrated circuit component by the software entity, wherein $SF_{IC\_freq}$ is an interconnect controller operating frequency scaling factor based on the operating frequency of the interconnect controller, and wherein $SF_{IC\_util}$ is an interconnect controller utilization scaling factor based on the utilization of the interconnect controller by the software entity.

8. The method of claim 1, the method further comprising:

determining that the integrated circuit component power consumption has exceeded a power limit of the integrated circuit component based on the integrated circuit component power consumption; and selecting the software entity from among a plurality of software entities executing on the integrated circuit component for reduced power consumption based on the software entity power consumption, wherein causing an action to be taken at the second computing device to reduce power consumption of the software entity comprises causing an operating frequency of at least one of the plurality of physical processor units allocated to the virtual processor unit to be reduced.

9. The method of claim 1, wherein the software entity is a first software entity and the software entity power consumption of the first software entity is a first software entity power consumption, the first software entity and one or more second software entities are associated with a user entity, individual of the one or more second software entities having an associated second software entity power consumption, the method further comprising:

summing the first software entity power consumption and the second software entity power consumptions to generate a total software entity power consumption; and determining that the total software entity power consumption exceeds a power budget, wherein causing an action to be taken at the second computing device to reduce power consumption of the first software entity is taken in response to determining that the total software entity power consumption exceeds the power budget.

10. The method of claim 9, wherein the action comprises terminating execution of the first software entity.

11. The method of claim 1, wherein the software entity is a virtual network function and the causing the action to be taken at the second computing device is performed by a network function virtualization orchestrator operating on the first computing device.

12. The method of claim 1, wherein the software entity is a network slice.

13. One or more non-transitory computer-readable storage media having instructions stored thereon that, when executed by a first computing system cause one or more first physical processor units of a first computing device to:

receive telemetry information associated with a computing platform of a second computing device on which a software entity is executing, wherein the computing platform comprises an integrated circuit component comprising a plurality of second physical processor units and non-processor unit circuitry, the software entity executing on a virtual processor unit to which one or more of the plurality of second physical processor units are allocated, and the telemetry information comprises information indicating an integrated circuit component power consumption;

determine, at the first computing device a software entity power consumption for the software entity based on the telemetry information, wherein to determine the software entity power consumption comprises:

to determine a per-processor unit power consumption based on the integrated circuit component power consumption and a number of second physical processor units in the plurality of second physical processor units; and to determine the software entity power consumption by scaling the per-processor unit power consumption by a sum of:

a processor unit power consumption scaling factor or a product of a plurality of processor unit power consumption scaling factors indicating a portion of integrated circuit component power consumed by the plurality of second physical processor units; and a non-processor unit circuitry power consumption scaling factor or a product of a plurality of non-processor unit circuitry power consumption scaling factors indicating a portion of integrated circuit component power consumed by the non-processor unit circuitry; and cause an action to be taken at the second computing device to reduce power consumption of the software entity.

14. The one or more non-transitory computer-readable storage media of claim 13, wherein the telemetry information further comprises one or more of: physical processor unit active information, information indicating an operating frequency for individual of the one or more second physical processor units, information indicating a reference operating frequency of the integrated circuit component, and utilization of the virtual processor unit by the software entity, and wherein the product of the plurality of processor unit power consumption scaling factors comprises a product of one or more of: a physical processor unit active scaling factor indicating a portion of time that a physical processor unit on which the software entity is executing is in an active state that is based on the physical processor unit active information, a physical processor unit operating frequency scaling based on the reference operating frequency of the integrated circuit component and the operating frequency of the individual of the one or more second physical processor units, a virtual processor unit-to-physical processor unit scaling factor indicating a number of the one or more second physical processor units allocated to the virtual processor unit, and a virtual processor unit utilization scaling factor indicating a utilization of a virtual processor unit on which the software entity is executing that is based on the utilization of the virtual processor unit by the software entity.

15. The one or more non-transitory computer-readable storage media of claim 13, wherein the non-processor unit circuitry comprises a memory controller and an interconnect controller, wherein the telemetry information further comprises one or more of: information indicating one or more operating frequencies of the non-processor unit circuitry, information indicating a reference operating frequency of the integrated circuit component, information indicating an operating frequency of the memory controller, information indicating a utilization of a memory external to the integrated circuit component by the software entity, information indicating an operating frequency of the interconnect controller, information indicating utilization of the interconnect controller by the software entity, and utilization of the virtual processor unit by the software entity, and wherein the product of the plurality of non-processor unit circuitry power consumption scaling factors comprises a product of one or more of: a non-processor unit circuitry operating frequency scaling factor based on the reference operating frequency of the integrated circuit component and the one or more operating frequencies of the non-processor unit circuitry, a memory controller operating frequency scaling factor based on the reference operating frequency of the integrated circuit component and the operating frequency of the memory controller, a memory utilization scaling factor based on the utilization of the memory external to the integrated circuit component by the software entity, an interconnect controller operating frequency scaling factor based on the operating frequency of the interconnect controller, an interconnect controller utilization scaling factor based on the utilization of the interconnect controller by the software entity.

16. The one or more non-transitory computer-readable storage media of claim 13, wherein the telemetry information further comprises second physical processor unit active information and information indicating a utilization of the virtual processor unit by the software entity, wherein the software entity power consumption is determined according to:

$$P_{swe}=P_{ppu}(SF_{pu}SF_{pu\_active}SF_{vpu\_ppu}SF_{util\_vpu}+SF_{npu})$$

wherein $P_{swe}$ is the software entity power consumption, wherein $P_{ppu}$ is a per-processor unit power consumption based on the integrated circuit component power consumption and a number of second physical processor units in the plurality of second physical processor units, wherein $SF_{pu}$ is a processor unit power consumption scaling factor indicating a portion of integrated circuit component power consumed by the plurality of second physical processor units, wherein $SF_{pu\_active}$ is a second physical processor unit active scaling factor indicating a portion of time that a second physical processor unit on which the software entity is executing is in an active state and $SF_{pu\_active}$ is based on the second physical processor unit active information, wherein $SF_{vpu\_ppu}$ is a virtual processor unit-to-second physical processor unit scaling factor indicating a number of the plurality of second physical processor units allocated to the virtual processor unit, wherein $SF_{util\_vpu}$ is a virtual processor unit utilization scaling factor indicating a utilization of the virtual processor unit by the software entity and $SF_{util\_vpu}$ is based on the utilization of the virtual processor unit by the software entity, and wherein $SF_{npu}$ is a non-processor unit circuitry power consumption scaling factor indicating a portion of integrated circuit component power consumed by the non-processor unit circuitry.

17. The one or more non-transitory computer-readable storage media of claim 13, wherein the telemetry information further comprises second physical processor unit active information, information indicating a reference operating frequency of the integrated circuit component, information indicating one or more operating frequencies of the non-processor unit circuitry, and information indicating a utilization of the virtual processor unit by the software entity, wherein the software entity power consumption is determined according to:

$$P_{swe}=P_{ppu}(SF_{pu}SF_{pu\_active}SF_{vpu\_ppu}SF_{util\_vpu}+$$
$$SF_{npu}SF_{npu\_freq})$$

wherein $P_{swe}$ is the software entity power consumption, wherein $P_{ppu}$ is a per-processor unit power consumption based on the integrated circuit component power consumption and a number of second physical processor units in the plurality of second physical processor units, wherein $SF_{pu}$ is a processor unit power consumption scaling factor indicating a portion of integrated circuit component power consumed by the plurality of second physical processor units, wherein $SF_{pu\_active}$ is a second physical processor unit active scaling factor indicating a portion of time that a second physical processor unit on which the software entity is executing is in an active state and $SF_{pu\_active}$ is based on the second physical processor unit active information, wherein $SF_{vpu\_ppu}$ is a virtual processor unit-to-second physical processor unit scaling factor indicating a number of the plurality of second physical processor units allocated to the virtual processor unit, wherein $SF_{util\_vpu}$ is a virtual processor unit utilization scaling factor indicating a utilization of a virtual processor unit on which the software entity is executing and $SF_{util\_vpu}$ is based on the information indicating the utilization of the virtual processor unit by the software entity, wherein $SF_{npu}$ is a non-processor unit circuitry power consumption scaling factor indicating a portion of integrated circuit component power consumed by non-processor unit circuitry, and wherein $SF_{npu\_freq}$ is a non-processor unit circuitry operating frequency scaling factor based on the information indicating a reference operating frequency of the integrated circuit component and the information indicating the one or more operating frequencies of the non-processor unit circuitry.

18. The one or more non-transitory computer-readable storage media of claim 13, wherein the telemetry information comprises information indicating an integrated circuit component power consumption, the instructions stored on the one or more non-transitory computer-readable storage media further cause the one or more first physical processor units to:

determine that the integrated circuit component power consumption exceeds a power limit of the integrated circuit component based on the integrated circuit component power consumption;

select the software entity from among a plurality of software entities executing on the integrated circuit component for reduced power consumption based on the software entity power consumption, wherein to cause an action to be taken at the second computing device to reduce power consumption of the software entity comprises to cause an operating frequency of at least one of the plurality of second physical processor units allocated to the virtual processor unit to be reduced.

19. The one or more non-transitory computer-readable storage media of claim 13, wherein the software entity is a first software entity and the software entity power consumption of the first software entity is a first software entity power consumption, the first software entity and one or more second software entities are associated with a user entity, individual of the one or more second software entities having an associated second software entity power consumption, the instructions stored on the one or more non-transitory computer-readable storage media further cause the one or more first physical processor units to:

sum the first software entity power consumption and the second software entity power consumptions to generate a total software entity power consumption; and determine that the total software entity power consumption exceeds a power budget, wherein to cause an action to be taken at the second computing device to reduce power consumption of the first software entity is performed in response to determining that the total software entity power consumption exceeds the power budget.

20. A computing system comprising:

one or more first physical processor units, wherein the computing system is a first computing system; and one or more computer-readable storage media storing instructions thereon that, when executed, cause the one or more first physical processor units to:

receive telemetry information associated with a computing platform of a second computing system on which a software entity is executing, wherein the computing platform comprises an integrated circuit component comprising a plurality of second physical processor units and non-processor unit circuitry, the software entity executing on a virtual processor unit to which one or more of the plurality of second physical processor units are allocated, and the telemetry information comprises information indicating an integrated circuit component power consumption;

determine a software entity power consumption for the software entity based on the telemetry information, wherein to determine the software entity power consumption comprises:

to determine a per-processor unit power consumption based on the integrated circuit component power consumption and a number of second physical processor units in the plurality of second physical processor units; and to determine the software entity power consumption by scaling the per-processor unit power consumption by a sum of:

a processor unit power consumption scaling factor or a product of a plurality of processor unit power consumption scaling factors indicating a portion of integrated circuit component power consumed by the plurality of second physical processor units; and a non-processor unit circuitry power consumption scaling factor or a product of a plurality of non-processor unit circuitry power consumption scaling factors indicating a portion of integrated circuit component power consumed by the non-processor unit circuitry; and cause an action to be taken at the second computing system to reduce power consumption of the software entity.

21. The computing system of claim 20, wherein the telemetry information further comprises one or more of: physical processor unit active information, information indicating an operating frequency for individual of the plurality of second physical processor units, information indicating a reference operating frequency of the integrated circuit component, and utilization of the virtual processor unit by the software entity, and wherein the product of the plurality of processor unit power consumption scaling factors comprises a product of one or more of: a physical processor unit active scaling factor indicating a portion of time that a second physical processor unit on which the software entity is executing is in an active state that is based on the physical processor unit active information, a physical processor unit operating frequency scaling based on the reference operating frequency of the integrated circuit component and the operating frequency of the individual of the plurality of second physical processor units, a virtual processor unit-to-physical processor unit scaling factor indicating a number of the plurality of second physical processor units allocated to the virtual processor unit, and a virtual processor unit utilization scaling factor indicating a utilization of a virtual processor unit on which the software entity is executing that is based on the utilization of the virtual processor unit by the software entity.

22. The computing system of claim 20, wherein the non-processor unit circuitry comprises a memory controller and an interconnect controller, wherein the telemetry information further comprises one or more of: information indicating one or more operating frequencies of the non-processor unit circuitry, information indicating a reference operating frequency of the integrated circuit component, information indicating an operating frequency of the memory controller, information indicating a utilization of a memory external to the integrated circuit component by the software entity, information indicating an operating frequency of the interconnect controller, information indicating utilization of the interconnect controller by the software entity, and utilization of the virtual processor unit by the software entity, and wherein the product of the plurality of non-processor unit circuitry power consumption scaling factors comprises a product of one or more of: a non-processor unit circuitry operating frequency scaling factor based on the reference operating frequency of the integrated circuit component and the one or more operating frequencies of the non-processor unit circuitry, a memory controller operating frequency scaling factor based on the reference operating frequency of the integrated circuit component and the operating frequency of the memory controller, a memory utilization scaling factor based on the utilization of the memory external to the integrated circuit component by the software entity, an interconnect controller operating frequency scaling factor based on the operating frequency of the interconnect controller, an interconnect controller utilization scaling factor based on the utilization of the interconnect controller by the software entity.

23. The computing system of claim 20, wherein the software entity is a first software entity and the software entity power consumption of the first software entity is a first software entity power consumption, the first software entity and one or more second software entities are associated with a user entity, individual of the one or more second software entities having an associated second software entity power consumption, the instructions stored on the one or more computer-readable storage media further cause the one or more first physical processor units to:

sum the first software entity power consumption and the second software entity power consumptions to generate a total software entity power consumption; and determine that the total software entity power consumption exceeds a power budget, wherein to cause an action to be taken at the second computing system to reduce power consumption of the first software entity is performed in response to determining that the total software entity power consumption exceeds the power budget.

* * * * *